(12) United States Patent
Krekian et al.

(10) Patent No.: US 12,525,150 B2
(45) Date of Patent: Jan. 13, 2026

(54) LASER PRINTABLE METALLIC LABEL ASSEMBLY

(71) Applicant: CCL Label, Inc., Framingham, MA (US)

(72) Inventors: Sharis Krekian, Glendale, CA (US); Joshua Petrie, Yorba Linda, CA (US); Sriram Venkatasanthanam, Chino Hills, CA (US); Douglas W. Wilson, San Dimas, CA (US); Christine Tu, Brea, CA (US)

(73) Assignee: CCL Label, Inc., Framingham, MA (US)

( * ) Notice: Subject to any disclaimer, the term of this patent is extended or adjusted under 35 U.S.C. 154(b) by 5 days.

(21) Appl. No.: 18/588,323

(22) Filed: Feb. 27, 2024

(65) Prior Publication Data

US 2024/0265830 A1    Aug. 8, 2024

Related U.S. Application Data

(63) Continuation of application No. 16/678,655, filed on Nov. 8, 2019, now Pat. No. 11,915,620.
(Continued)

(51) Int. Cl.
*G09F 3/00* (2006.01)
*B32B 15/04* (2006.01)

(52) U.S. Cl.
CPC ............ *G09F 3/0297* (2013.01); *B32B 15/04* (2013.01); *B32B 2250/03* (2013.01);
(Continued)

(58) Field of Classification Search
CPC ....................................................... C09J 7/22
See application file for complete search history.

(56) References Cited

U.S. PATENT DOCUMENTS

2003/0099827 A1*  5/2003  Shih ................... B32B 15/04
                                                       428/343
2005/0255262 A1  11/2005  Nomula et al.
(Continued)

FOREIGN PATENT DOCUMENTS

CN      108417138       8/2018
EP        1595801      11/2005
(Continued)

OTHER PUBLICATIONS

SP Morell Newsletter and copy via Internet Wayback machine from Feb. 21, 2016.*
(Continued)

*Primary Examiner* — Alex A Rolland
(74) *Attorney, Agent, or Firm* — McDonald Hopkins LLC

(57) ABSTRACT

Provided is an anti-static and high-heat resistant label sheet comprising a film, metallic interlayer, and adhesive. The metallic interlayer comprises pigments that are smoother, have a rounded edge, and result in a more homogenous thickness with minimal to no surface defects, which allow for increased reflectivity and vibrancy of the pigments and label sheet. The pigments are also aligned as to form channels within the metallic interlayer for dispersing and preventing buildup of static electricity. The label sheet may further comprise a printable top coat, primer coating, a colored coating, and a liner layer. The printed label sheets may be used for asset tracking and security labeling, such as barcoding products and inventory. The metallic color and reflectivity of the label sheets, and the die-cut labels thereon, may enable readability of the barcodes with a handheld scanner up to 24 inches distance.

13 Claims, 25 Drawing Sheets

Related U.S. Application Data

(60) Provisional application No. 62/757,424, filed on Nov. 8, 2018.

(52) U.S. Cl.
CPC ............ *B32B 2307/21* (2013.01); *B32B 2307/4023* (2013.01); *B32B 2307/75* (2013.01); *B32B 2311/24* (2013.01); *B32B 2519/00* (2013.01)

(56) References Cited

U.S. PATENT DOCUMENTS

| | | |
|---|---|---|
| 2007/0252382 A1 | 11/2007 | Baum et al. |
| 2014/0308471 A1 | 10/2014 | Jokinen et al. |
| 2015/0301500 A1 | 10/2015 | Fickes et al. |
| 2016/0018748 A1* | 1/2016 | Koger .............. G03G 7/00 428/220 |
| 2017/0205321 A1 | 7/2017 | Sasaki et al. |

FOREIGN PATENT DOCUMENTS

| | | |
|---|---|---|
| GB | 2238755 | 6/1991 |
| JP | 2005001676 | 6/2005 |

OTHER PUBLICATIONS

International Search Report and Written Opinion in connection with Patent Application No. PCT/US2019/060557 dated May 4, 2020; 126 pages.

SP Morell Newsletter and copy via Internet Wayback machine from Feb. 21, 2016 (Rear: 2016).

\* cited by examiner

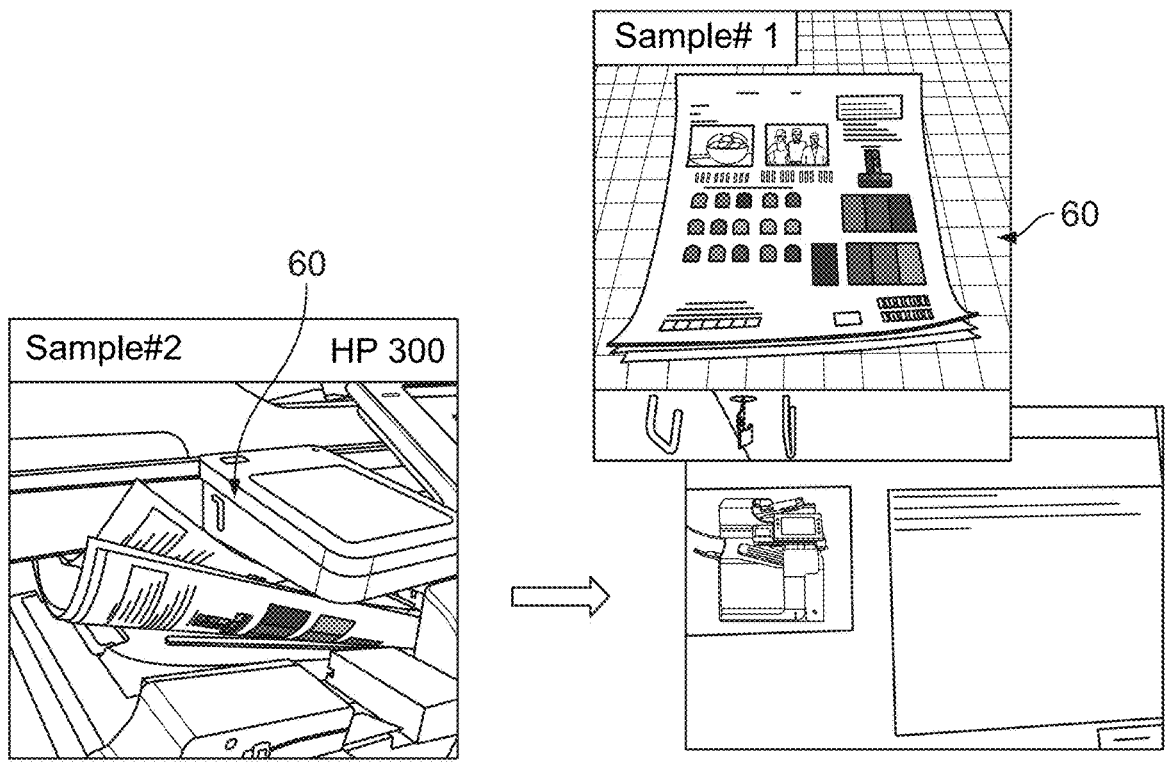
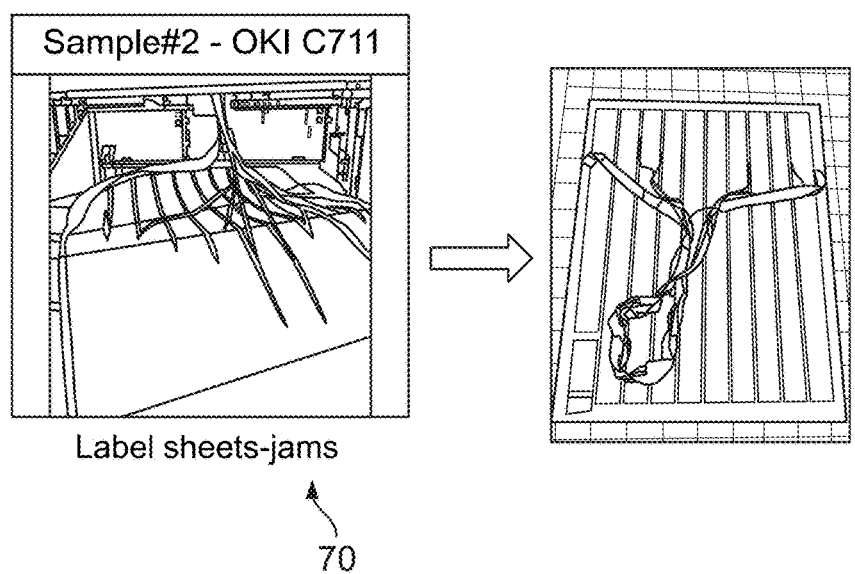
FIG. 3

100

Comparative

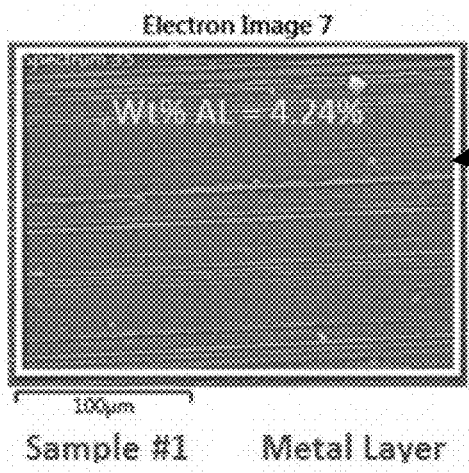
FIG. 15A — Comparative
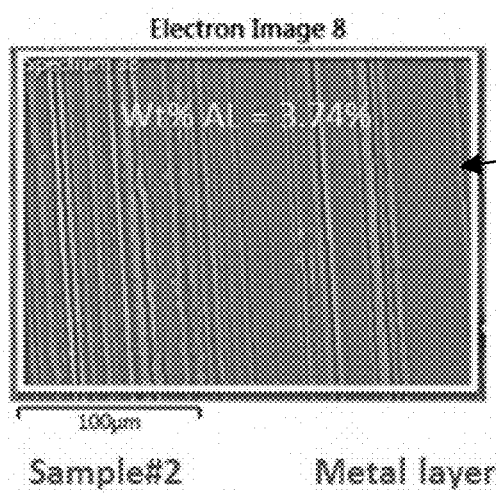
FIG. 15B — Comparative
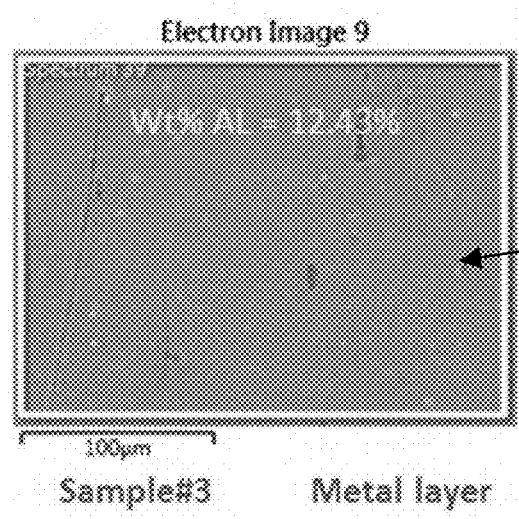
FIG. 15C — Comparative

LASER PRINTABLE METALLIC LABEL ASSEMBLY

CROSS-REFERENCE TO RELATED APPLICATIONS

The present application is a continuation of U.S. application Ser. No. 16/678,655 filed on Nov. 8, 2019, which claims priority to U.S. Provisional Application No. 62/757,424, the disclosure of each of which is incorporated herein by reference in its entirety.

FIELD OF THE INVENTION

The present disclosure relates generally to label constructions and, more particularly, to anti-static and high-heat resistant printable label assemblies comprising a metallic interlayer, and methods of making thereof.

BACKGROUND

FIG. 1 depicts a laser printing process. The laser printing process typically involves manipulation of static electricity and high heat. For example, the first stage 2 of the laser printing process begins by charging a drum of a laser printer with either a positive or negative charge. In the second stage 4, an image is made on the drum, distinguished from the remaining backdrop based on an opposite charge. For example, a negatively charged image may be made on a positive backdrop or a positively charged image may be made on a negative backdrop. The image may be made by either manipulating the charge that will make up the image or the charge that surrounds the image. In the third stage 6, an oppositely charged toner is attached to the image. For example, if the image is positively charged on the drum, a negative charged toner may be used to print the image on the drum. In the fourth stage 8, the toner is pulled from the drum by a highly charged paper or substrate and fused at a high heat, in the fusing area, where the temperature can reach up to 400° F. Overall, the laser printing process involves charging a substrate to allow for toner to transfer to the substrate and produce a printed image.

As a result of the static electricity and the high heat used in the laser printing process, the use of conventional paper, substrates, or metallic labels in a laser printer have been found to cause various problems. For example, the use of paper, substrates, or metallic labels have been found to build up and store the electrical charge after laser printing 10, compounded when stacked together, and can result in a static shock to an operator who attempts to touch the pages or remove the pages from the laser printer output tray, see at least Comparative Example 3 in FIG. 10.

As depicted in FIGS. 2-3, the laser printing process has also been found to destabilize the dimensional integrity of the conventional paper, substrates, or metallic labels and can cause curling 40, sticking 20, jamming 70, mis-feeding, and otherwise halt the printing process. The curling 60 of the printed pages, preventing the printed pages from laying flat on each other, may also touch the sensor from the exit tray and inhibit further printing, such as after a mere 5 printed pages. The printed pages can also be susceptible to bubbling 30, wrinkling 50, and chemical exposure and often can result in poor print quality, see at least Comparative Example 1 in FIG. 2. For example, the static electricity can cause newly printed sheet to cling to its adjacent sheet and smudge the image causing a poor print quality.

Conventional metalized film products may be made by Physical Vapor Deposition process also known as PVD coating. PVD refers to a variety of thin film deposition techniques where solid metal is vaporized in a high vacuum environment and deposited on electrically conductive materials as a pure metal or alloy coating. Silver or colored metallic labels produced by PVD process have a layer of aluminum that is electrically conductive. The PVD metalized film is made of a continuous layer of metal without having a channel for the charges to escape or dissipate, as a result the charges can build up throughout the film and cause static shock, as illustrated in FIG. 1. As a result, the labels should not be used in laser printer applications due to these safety concerns and instead may only be suitable for inkjet printer applications. Film materials such as BOPP or polyolefin, and the like, may also not be suitable in laser printing applications due to their lower heat resistance that, due to the high temperature generated inside a laser printer, may be caused to jam, bubble, miss-feed and curl after printing, as shown in FIGS. 2-3.

Having found and determined these above noted problems when using a conventional paper, substrate, or metallic label with a laser printer, there may be the need for a label sheet that is resistant to high temperatures, has a low tendency to store electrical charge, and/or is able to dissipate electrical charges quickly without negatively impacting printing quality and resistance or longevity of the label. There may also be a need for an anti-static and high-heat resistant label sheet that can withstand the high temperatures and static charges utilized in laser printing.

SUMMARY

Disclosed is an anti-static and high-heat resistant printable label assembly, construction, or sheet comprising a metallic interlayer. The disclosed label sheet may exhibit anti-static, charge dissipation, and high-heat resistant properties, and may be used in laser printing or electrophotographic printing applications where static electricity and high temperatures are often used in the process. The label sheet may also exhibit abrasion resistance or high toner anchorage, chemical resistance, and surface resistance properties, and provide high quality printer performance. The label sheet may also be resistant to curling, sticking, jamming, mis-feeding, bubbling, wrinkling, chemical exposure, and other print quality problems.

In an embodiment, a printable label sheet may comprise a film layer having a first surface and a second surface; a liner layer having an adhesive disposed on a first surface of the liner layer; and a metallic interlayer between the film layer and the adhesive on the liner layer, wherein the metallic interlayer comprises non-leafing ink pigments. The label sheet may further include a printable top-coat on the first surface of the film. The label sheet may further include a primer layer on the second surface of the film and between the film and the metallic interlayer, wherein the primer layer bonds the metallic interlayer to the film. The label sheet may further include a colored coating layer between the adhesive and the metallic interlayer. In an embodiment, the colored coating layer may be a grey ink.

In an embodiment, the total thickness of the printable label sheet may be between 6 to 10 mil, and more preferably, around 8 mil. The printable label sheet may dissipate a 1000 volt static charge to 100 volts in less than or equal to 5 seconds and, more preferably, less than or equal to 3 seconds. The surface resistance of the printable label sheet may be between 1.00 E+13 to 1.00 E+10, and more preferably, between 1.00 E+12 to 1.00 E+11. The stiffness of the printable label sheet may be within 100 mN-230 mN. The contact angle of the printable label sheet may be less than or equal to 50°. In an embodiment, the metallic interlayer may comprise less than 12% aluminum. In an embodiment, at 1 microns thickness the label sheet may have an aluminum wt % ranging from 2.5% to 10.5% distributed non-uniformly within the coating. The printable label sheet may be laser printed. The printable label sheet may be printed with barcodes. The printable label sheet may be used in asset tracking.

In an embodiment, the pigments of the non-leafing silver ink coating technology may be embedded into a matrix of the coated film. The non-leafing ink pigments may form channels within the metallic interlayer. The channels within the metallic interlayer may localize the static charges of the laser printing process and may prevent the build-up of static electricity and/or dissipate the static electricity quickly so as to result in a substantially shock-free performance. The non-leafing ink pigments have a generally smooth surface, a generally rounded shape, and are generally homogenous in thickness.

In an embodiment, the pigments may be distributed throughout the entire film-weight. In an embodiment, the non-leafing ink pigments may be silver. In an embodiment, the non-leafing silver metallic coating may comprise an aluminum particle blend in acrylated aliphatic urethane base resin, such as that provided by ACTEGA. In an embodiment, the metallic interlayer may comprise non-leafing silver dollar ink pigments with 100% solids UV curing system. The pigments of the non-leafing silver ink coating technology of the metallic interlayer may be produced by a complex milling process so that the ink pigments may be smoother, have a rounded edge, and result in a more homogenous thickness with minimal to no surface defects. As a result, the ink pigments and the metallic interlayer may demonstrate a high reflectance and scattering of visible light, and an overall high vibrancy of the metal color.

The label sheets may be laser printed continuously without changing the dimensional stability of the label sheets and may exit printer without curling, sticking, jamming, misfeeding, or otherwise inhibiting the printing process. The printed label sheets may stack on each other flat after printing and may prevent the built up of static electricity so that the printed stacks may be handled by operators with a reduced risk of receiving a shock, e.g. a static electric shock, an electric shock, and the like. Alternatively or additionally, after a charge has been built on the printed label sheet during the laser printing process, as may be evidenced by a good laser print quality, the printed label sheets may dissipate the static charges at a faster rate than conventional methods, resulting in a shock-free performance, (i.e. by the time an operator touches the printed label sheets, most of the charge has dissipated, resulting in no significant shock). The printed label sheets may also be resistant to bubbling, wrinkling, and chemical exposure and may result in enhanced sustained print quality. The non-leafing silver ink coating layer, and its corresponding heat resistance properties, enable the printed label sheets to stack on top of each other flat as they exit the printer and further prevent building up static electricity within the stacked sheets.

A method of making a printable label sheet may comprise forming a film layer having a first surface and a second surface; optionally coating the first surface of the film layer with a printable coating layer; depositing a primer layer on the second surface of the film layer; depositing a metallic interlayer on the primer layer; depositing a colored coating layer on the metallic interlayer; depositing an adhesive on the colored coating layer; depositing a liner layer on the adhesive; wherein the metallic interlayer comprises non-leafing ink pigments. In an embodiment, individual labels may be die cut into the label sheet through all the layers except the liner layer. In an embodiment, one or more of the layers may be UV-cured.

The label sheet may further include a sheet of film optionally coated with a printable top-coat, a primer coating, a colored coating such as a grey coating, an adhesive, and/or a liner layer.

In an embodiment, a film may have a first side and a second side. The first side of the film may be coated for printability or the film may comprise a printable material. A metallic interlayer may be applied to the second side of the film. The film may be of a material that is clear, transparent, semi-transparent, translucent, semi-translucent or the like. The color and reflectivity of the metallic interlayer on the second side of the film may be visible from the first side of the film. In an embodiment, the film may have a first and a second side. The metallic interlayer may be applied to the first side of the film for printing. The metallic interlayer may be coated with a laser toner receptive primer.

In an embodiment, the adhesive may be a permanent adhesive. The adhesive may attach the film and metallic interlayer to a product. The strong adhesive bonding property may allow application and attachment to a variety of surfaces, such as high and low energy plastic surfaces. In an embodiment, the printed label sheets may be used for asset tracking and security labeling. In an embodiment, the printed label sheets may comprise printed barcodes. The metallic color and reflectivity of the label sheets, and the die-cut labels thereon, may enable readability of the barcodes with a handheld scanner up to 24 inches distance.

In an embodiment, a printable label sheet may comprise a film layer having a first surface and a second surface; a liner layer having an adhesive disposed on a first surface of the liner layer; and a metallic interlayer between the film layer and the adhesive on the liner layer, wherein the metallic interlayer comprises non-continuous ink pigments.

In an embodiment, the printable sheet may comprise (1) a printed layer of ink incorporating metallized aluminum pigments produced under vacuum (VMP) to achieve mirror-like metallic finish and (2) a topcoat incorporating anti-static agents to facilitate fast charge dissipation. The printable sheet may exhibit non-shock properties.

The following description and the drawings disclose various illustrative aspects. Some improvements and novel aspects may be expressly identified, while others may be apparent from the description and drawings.

BRIEF DESCRIPTION OF THE DRAWINGS

The present teachings may be better understood by reference to the following detailed description taken in connection with the following illustrations, wherein:

FIGS. 2 and 3 are various images depicting problems found when using conventional paper, substrates, or metallic labels in laser printer applications;

FIG. 15A-C show electron images of metal layers of Comparative Examples 1-3;

DETAILED DESCRIPTION

Figure 1:
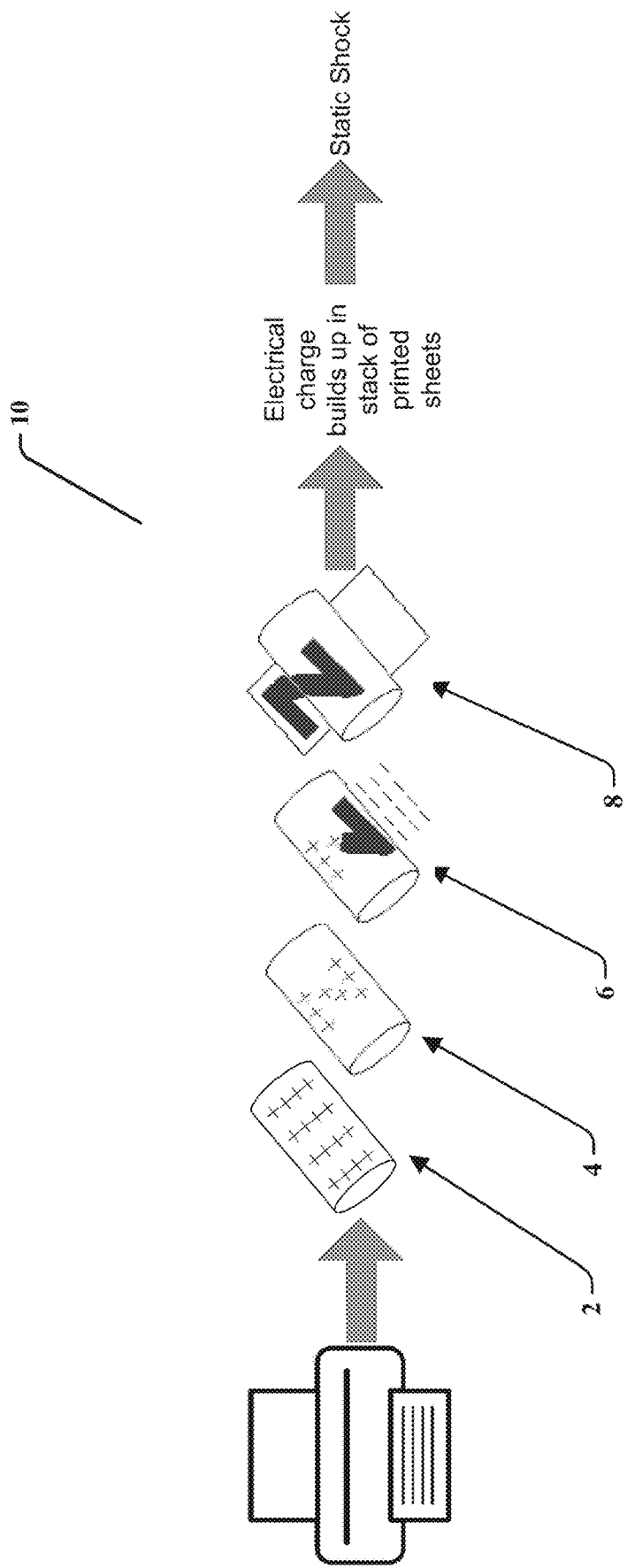
FIG. 1 is schematic of a laser printing process and the build up of electrical charge and static shock when using conventional paper, substrates, or metallic labels.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Further, unless context suggest otherwise, descriptions of shapes (e.g., circular, rectangular, triangular, etc.) refer to shapes meeting the definition of such shapes and general representation of such shapes. For instance, a triangular shape or generally triangular shape may include a shape that has three sides and three vertices or a shape that generally represents a triangle, such as a shape having three major sides that may or may not have straight edges, triangular like shapes with rounded vertices, etc.

While embodiments may refer to a particular example of the described label sheet as for use in laser printing applications, it is noted that disclosed embodiments may be applicable to various other items, products, and industries. Generally, described embodiments may be utilized for any application that requires labels, printable labels, etc. As an example, the label assemblies or label sheets may be utilized for packaging, product tracking, stickers, decorations, and detailing as for cars, electronics, household items, etc.

Provided is an anti-static and high-heat resistant printable label assembly, construction, or sheet 100. Label sheet material, substrates, inks and constructions play a factor in the level of static charge that might be generated and trapped and whether the label sheet may withstand high temperatures, both of which are present in laser printing. The present invention relates to combination of materials, inks, and a layer construction that despite their metallic appearance reduce build up of static charges upon laser printing and that have high-heat resistance.

Figure 4A:
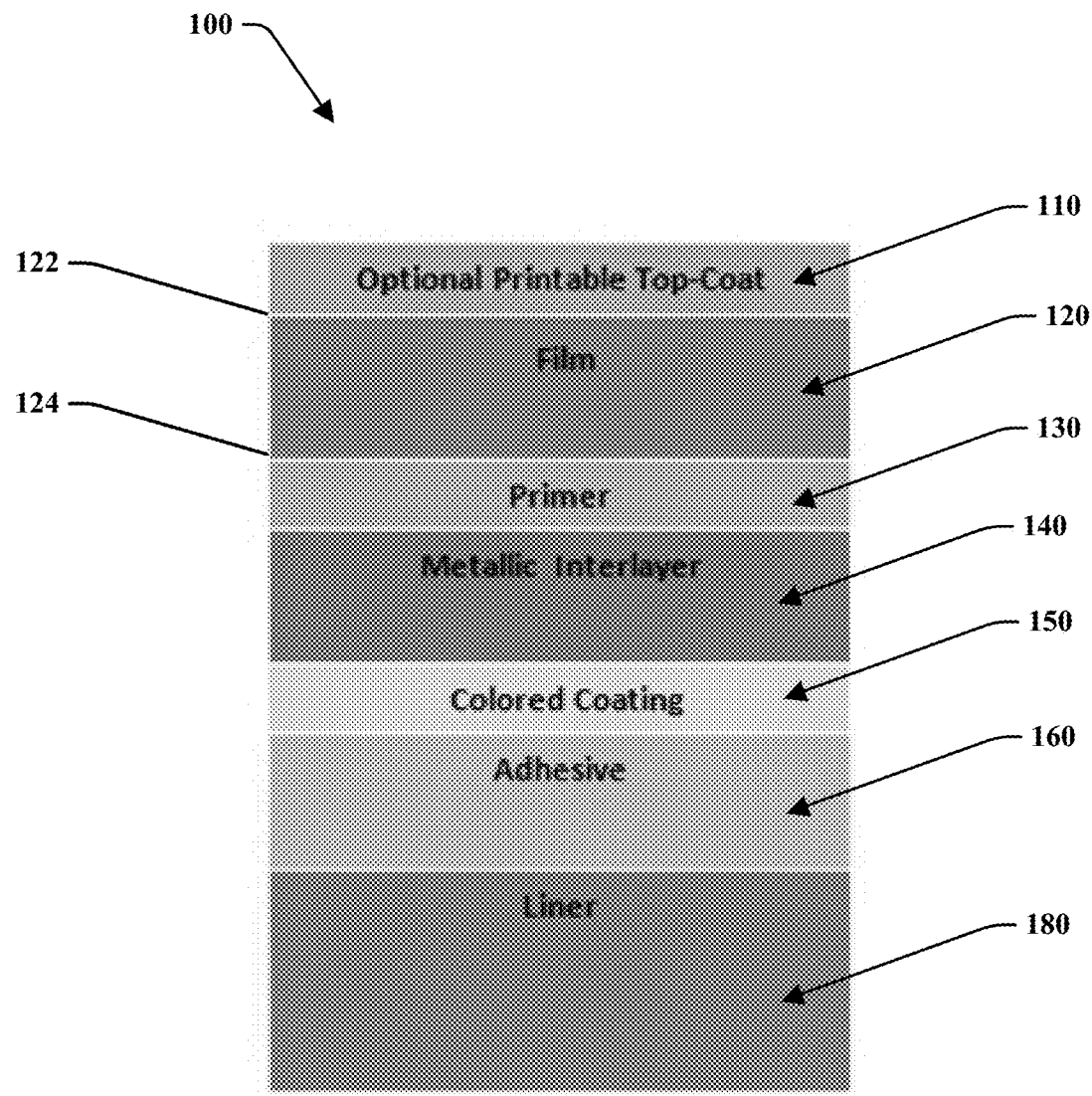
FIGS. 4A-C depict various, non-exhaustive embodiments of a label sheet with varying layer constructions.
Figure 4B:
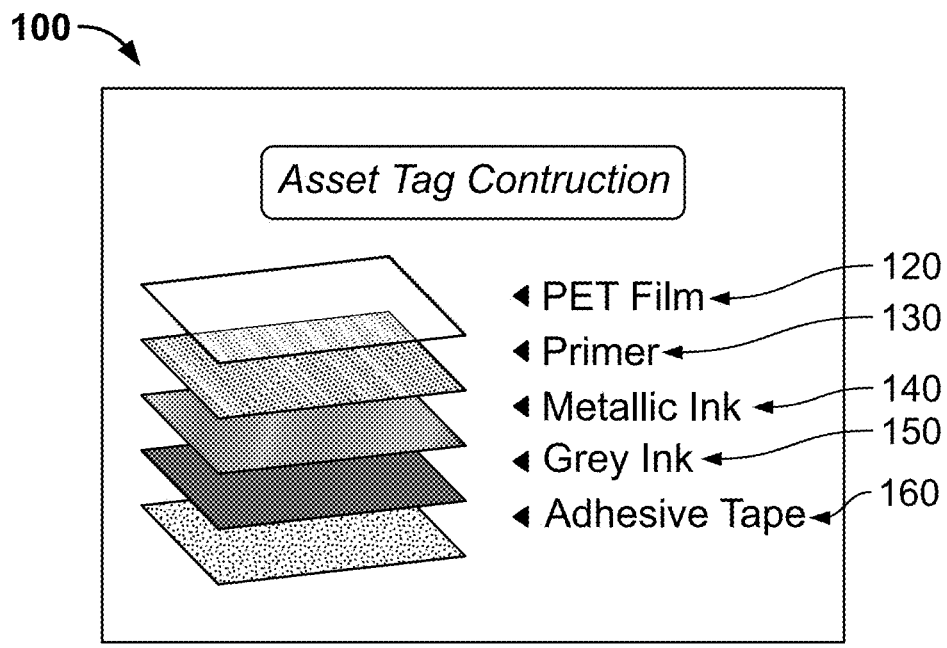
Figure 4C:
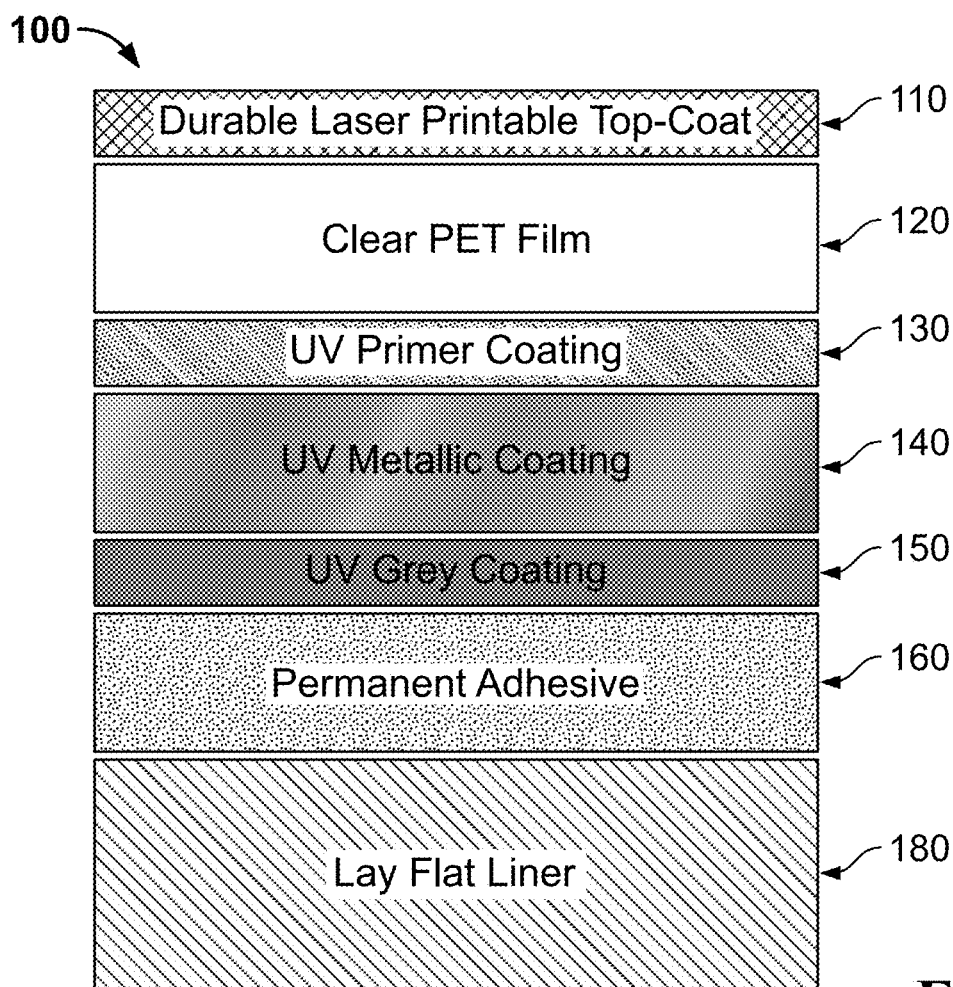

FIGS. 4A-C depict various, non-exhaustive embodiments of the label sheet 100. In an embodiment, the label sheet 100 may comprise a film 120, metallic interlayer 140, adhesive 160, and/or liner layer 180. The label sheet may further comprise an optional printable top coat 110 to be applied to a first side or outer surface 122 of the film 120, or the film 120 itself may comprise a printable material or be supplied pre-treated or pre-coated with a toner receptive coating 110. The printable top coat or toner receptive coating 110 may include, but is not limited to, NuCoat DIGITALL 8503 GL, or Flint UEV00107 Ekocure Shrink Primer. Pre-coated films 120 include, but are not limited to, inkjet and/or laser receptive coatings such as Sihl 33414/7868 PICO Film P-36 PET film, as well as liquid toner receptive coating for HP Indigo print technology. The durability of the printed image may depend on the type of ink receptive coatings 110 as well as the print technology. For example, in order to add chemical resistance functionality for the image that is printed with HP Indigo ink, a varnish coating or a film laminate 110 may be used post-HP Indigo printing for added durability. A varnish coating or a film laminate 110 may also be used with other printers, inks, and printing technology for added durability.

The label sheet 100 may be a single film layer construction. In an embodiment, this single layer film construction may reduce the overall mass of the construction and may allow for more effective toner fusing during laser printing, including less heat dissipation and more concentrated at the fuser. The resulting toner anchorage, as shown herein, may be higher.

The film 120 may be of a material that is clear, transparent, semi-transparent, translucent, semi-translucent or the like. The color and reflectivity of the metallic interlayer 140, directly under a second side 124 of the film 120 or indirectly under the film 120 separated by a primer 130, may be visible from the first side 122 of the film 120. The film 120 may be a PET film, including, but not limited to, Dunmore DK362, Polyplex Sarafil SF 1AA, or Sarafil HG188. In another embodiment, the metallic interlayer 140 may be applied to the first side 122 of the film 120 for printing. The metallic interlayer 140 may be coated with a laser toner receptive primer 130.

Figure 5A:
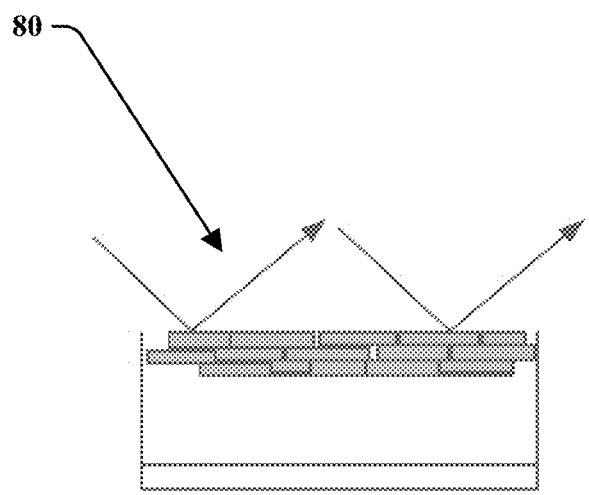
FIG. 5A depicts the reflectivity and orientation of leafing pigments and FIG. 5B depicts the reflectivity and orientation of a metallic interlayer comprising non-leafing pigments in a label sheet.
Figure 5B:
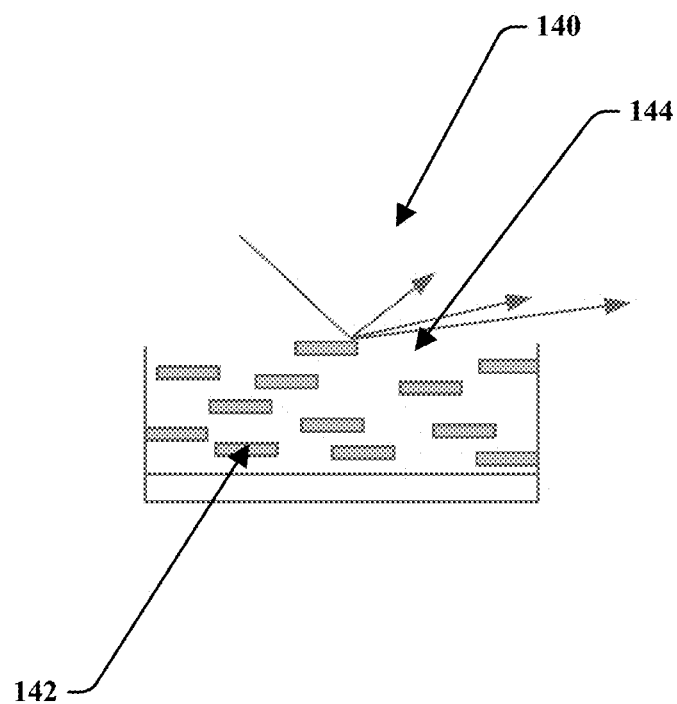

The metallic interlayer 140 may include a non-leafing silver ink coating technology. The pigments 142 of the non-leafing silver ink coating technology of the metallic interlayer 140 may be well embedded into a matrix of the coated film 120 and the pigments 142 may be aligned to create a channel 144 or a series of channels intermeshed within the metallic interlayer 140. The pigments 142 may be intermeshed or mixed with another component to provide the channels 144 or the shape of the pigments 142 may itself provide channels 142 within the metallic interlayer 140. The channels 144 within the metallic interlayer 140 may localize the static charges of the laser printing process and may prevent the build-up of static electricity and/or dissipate the static electricity quickly so as to result in a substantially shock-free performance, as shown in FIG. 5B. FIG. 5B illustrates the orientation of the pigments 142 and their associated reflectivity; as well as the formation of channels 144. The pigments 142 may be distributed throughout the entire metallic interlayer. In an embodiment, the non-leafing silver metallic coating of the metallic interlayer 140 may comprise an aluminum particle blend in acrylated aliphatic urethane base resin, including, but not limited to, that provided by ACTEGA. The silver ink may also include L3915XX8B8UJ Flex Metal Mirror Silver A01 provided by Siegwerk USA Co. In an embodiment, the metallic interlayer 140 may comprise non-leafing silver dollar ink pigments 142 with 100% solids UV curing system. Table 1 describes characteristics of an example of a non-leafing silver metallic coating that may be used in accordance with this disclosure:

TABLE 1

| Pigment content | 8.0 ± 0.2% |
|---|---|
| Pigment size ($D_{50}$)[1] | 8.5 ± 0.5 μm |
| Solvent content | 0% |
| VOC | 0% |
| Supplied viscosity[2] | 0.15 ± 0.05 Pa's |
| Supplied density | 1.15 ± 0.05 g/ml |

[1]Data related to pigment measurement
[2]Data obtained using cone and plate rheometer (TA Instruments)

Figure 6A:
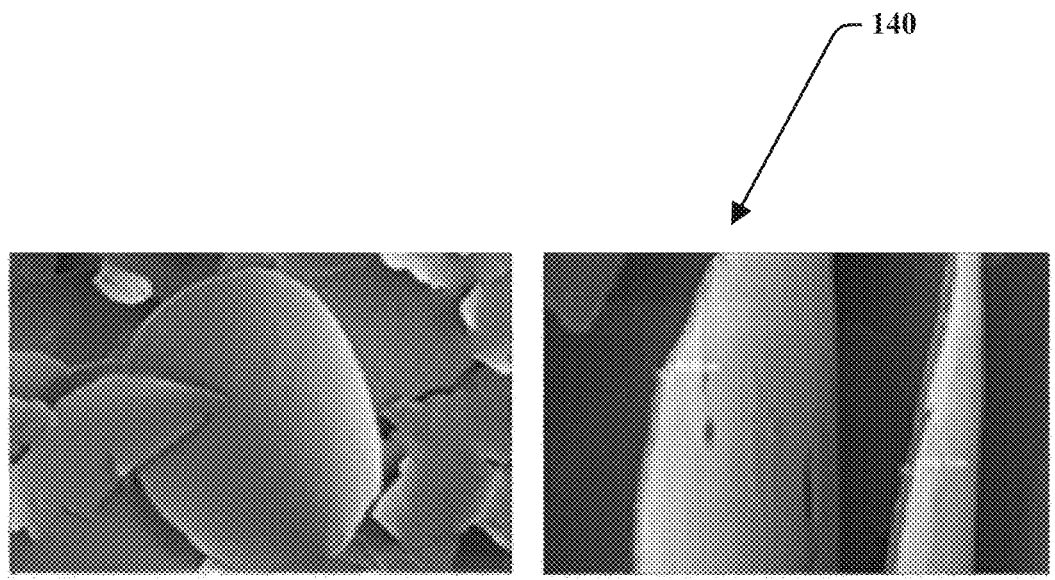
FIG. 6A shows physical images and characteristics of a metallic interlayer that may be used in a label sheet.
Figure 6B:
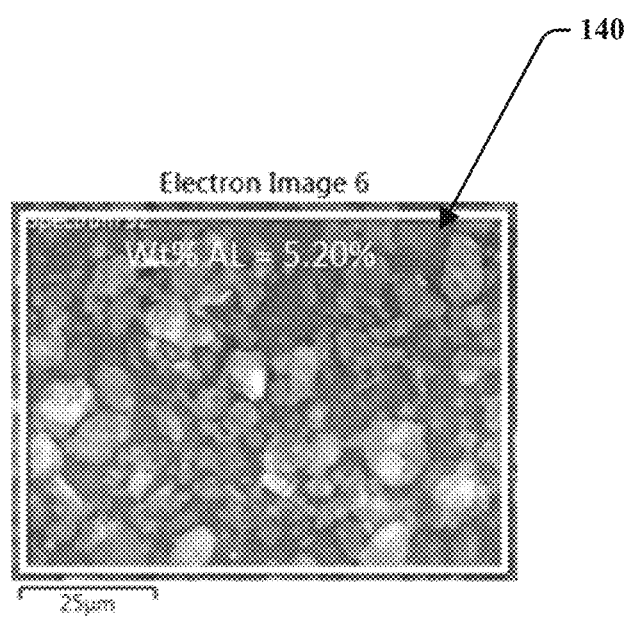
FIG. 6B shows an electron image of a metallic interlayer.

The pigments 142 of the non-leafing silver ink coating technology of the metallic interlayer 140 may be produced by a complex milling process so that the ink pigments 142 may be smoother, have a rounded edge, and result in a more homogenous thickness with minimal to no surface defects, see FIGS. 6A-B. These resulting ink pigments 142 may also be referred to as silver dollar pigments. As a result, the ink pigments 142 and the metallic interlayer 140 may demonstrate a reduced reflectivity due to scattering of visible light, and an overall high vibrancy of the metal color, see FIG. 5B. The vibrancy of the metal pigments 142 may be attributed, in part, to the visible light that reflects off the metal pigments 142. Metallic effect may be the sum of the light reflection and scattering. The orientation of the metallic pigments 142 in the metallic interlayer coating 140 may affect the brightness of color in demonstrating parallel alignment vs non-parallel alignment. FIG. 5A illustrates conventional leafing pigments 80 as compared to FIG. 5B showing the non-leafing pigments 142 that may be used in the label sheet 100. The non-leafing pigments 142 in FIG. 5B may have reduced reflection behavior due to light scattering as shown by the corresponding arrows, whereas the leafing pigments of FIG. 5A demonstrate greater reflectivity as shown by the parallel arrows. The non-leafing pigments may help limit the reduction in the reflection behavior. The channels 144 may attribute to increased light scattering. Conventional metal pigments 80 are exposed to strong mechanical forces during the production process and result in uneven metal flakes with irregular thicknesses and a high number of surface defects that negatively impact reflectiveness and visual appeal.

In an embodiment, the metallic interlayer may be printed. Compared to physical or chemical vapor deposition of the metallic particles, printing may be a more cost effective solution. Additionally, when printed, the metallic interlayer may be discontinuous in nature within an organic binder (acrylic). In an embodiment, the printable sheet may comprise (1) a printed layer of ink incorporating metallized aluminum pigments produced under vacuum (VMP) to achieve mirror-like metallic finish and (2) a topcoat incorporating anti-static agents to facilitate fast charge dissipation. The printable sheet may exhibit non-shock properties. The metallic interlayer and method thereof may result in discontinuous formation of aluminum clusters and varying concentration of the aluminum clusters throughout the coating. In an embodiment, a wider range of ink coating thickness may be possible without building up electric charge. In an embodiment, an increased thickness may be provided at a lower cost and may also provide a more heat stable construction without printer quality problems such as jams and wrinkling. Comparative Examples 1-3, on the other hand, show a continuous metal layer, see FIGS. 15A-C.

Figure 6C:
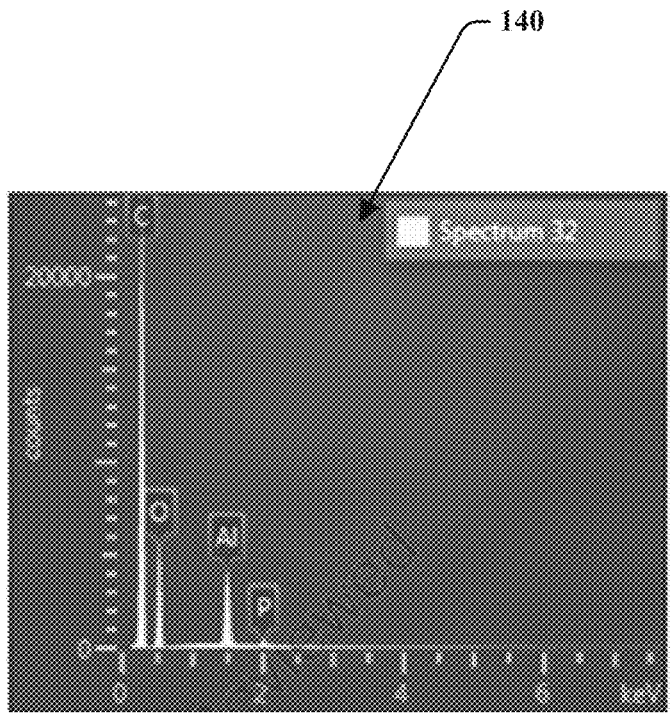
FIG. 6C shows an exemplary composition of a metallic interlayer.

FIG. 6C shows an exemplary composition of a metallic interlayer that may be used in the label sheet 100 and Table 2 below shows properties of an exemplary embodiment of a metallic interlayer that may be used in the label sheet 100. This embodiment is non-limiting and the metallic interlayer 140 may include various additional weights or other metals.

TABLE 2

| label sheet 100 | | | | |
|---|---|---|---|---|
| Element | Line Type | Wt % | Wt % Sigma | Atomic % |
| C | K series | 67.50 | 0.20 | 74.91 |
| O | K series | 26.76 | 0.20 | 22.30 |
| Al | K series | 5.20 | 0.05 | 2.57 |
| P | K series | 0.53 | 0.03 | 0.23 |
| Total | | 100.00 | | 100.00 |

Figure 7A:
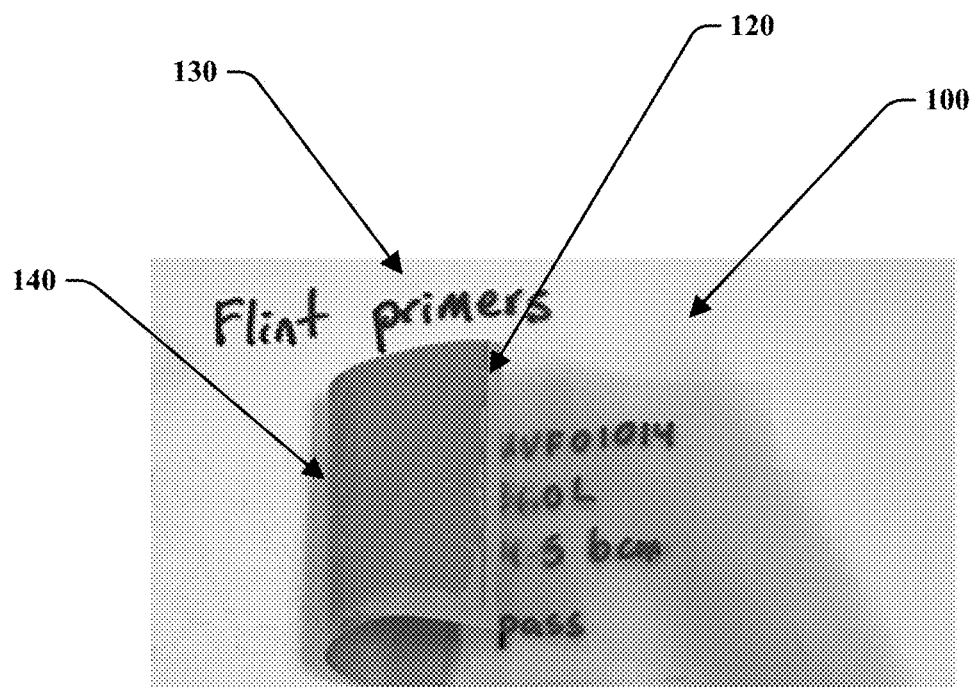
FIG. 7A depicts an embodiment of a label sheet including a primer coating, compared to a label sheet without the primer coating shown in FIG. 7B.
Figure 7B:
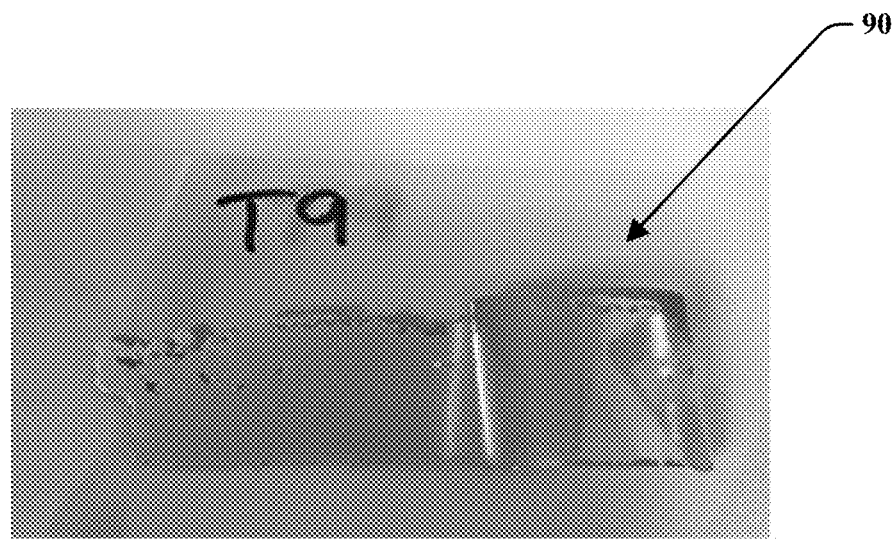

The label sheet 100 may further comprise a primer coating 130 located on the second side or underside of the film, or between the film 120 and the metallic interlayer 140. The primer coating 130 may promote anchoring of the metallic interlayer 140 and/or colored coating 150 to the film 120. The primer 130 may also aid in the repositioning of a label if the label is initially misapplied by a customer. The primer 130 may prevent breakdown of the metallic interlayer 140 and/or colored coating 150 when realigned. The label can be removed and repositioned cleanly without damaging the label or leaving silver ink on the substrate to which it is applied, see FIG. 7A. FIG. 7A shows a label with a coating primer 130, where the structural integrity of the label is maintained even through repositioning. FIG. 7B, on the other hand, shows a label without a primer coating 90, which may leave behind a silver residue and result in a breakdown of the metallic interlayer when repositioned. In another embodiment, the film 120 may be chemically pre-treated with other types of primer chemistry, such as acrylic, to promote the adhesion between the layers. The primer may include, but is not limited to, Flexocure Hot Stamp Primer UVF01014.

The label sheet 100 may further include a colored coating 150 between the metallic interlayer 140 and adhesive 160. The colored coating may be used to modify the visible color shade of the label sheet 100, to add opacity to the label sheet 100 so that the labels are not see-through, and/or to enhance barcode scanning in asset tracking applications. In an embodiment, the colored coating 150 may be a grey ink coating. For example, the grey ink may include, but is not limited to, RPN 401440 Pharmaflex SP OP Cool Grey #4. While the label sheet 100 may generally refer to a silver metallic interlayer 140 and a grey ink colored coating 150, it is noted that any colors may be used. For example, the label sheet 100 could include a gold metallic interlayer 140 and a yellow ink coating 150. The label sheet 100 may also utilize chrome, metallic, matte, glitter-based, and créme pigments in any conceivable color including violet, red, blue, yellow, green, orange, pink, brown, black, white, etc. The primer coating 130, metallic coating 140, and/or colored coating 150 may independently or together use UV/LED curing technology.

The adhesive 160 used with the label sheet 100 may be a permanent adhesive. In an embodiment, the adhesive 160 may be an ultra-permanent adhesive. The adhesive 160 may attach a label, including the film 120 and metallic interlayer 140, to a substrate or product. The strong adhesive bonding property and good lay flat property may allow application and attachment to a variety of surfaces, such as high and low energy plastic surfaces. The adhesive 160 may include, but is not limited to, an adhesive tape such as the 80 lb. lay flat liner supplied by Wausau Coated Products Inc. In an embodiment, the silver printed film 120 having a metallic interlayer 140 may be coated directly or laminated with adhesive 160, such as BASF UV 250, Artimelt UV N1 189, etc coated at 20 gsm or higher coat weights. A lay flat liner layer, such as Felix Schoeller poly coated release liner R 56107, may also be used. Table 3 below shows potential raw materials that may be used to create the label sheet 100. It is noted, however, that the label sheet 100 is not limited to these raw materials and that various other raw materials may be used as disclosed herein. The label sheets 100 may comprise any other order or combination of these various layers disclosed herein, and may incorporate any other suitable materials as known in the art.

TABLE 3

| Material | Supplier | Product Name |
| --- | --- | --- |
| Pet Film 120 | Dunmore Corporations | DK362-200 DK HIGH CLARITY CITC |
| Adhesive Tape 160 | Wausau Coated Products | W029164 -80#(Functional)Sil In/18017/ 1.2 mil CL PET(Disposable)Sil In |
| Primer 130 | Flint Group | Flexocure Hot Stamp Primer UVF01014 |
| Silver Ink 140 | ACTEGA | RMN801021 PURFLEX Shrink Silver |
| Grey Ink 150 | ACTEGA | RPN 401440 Pharmaflex SP OP Cool Grey #4 |

Figure 8:
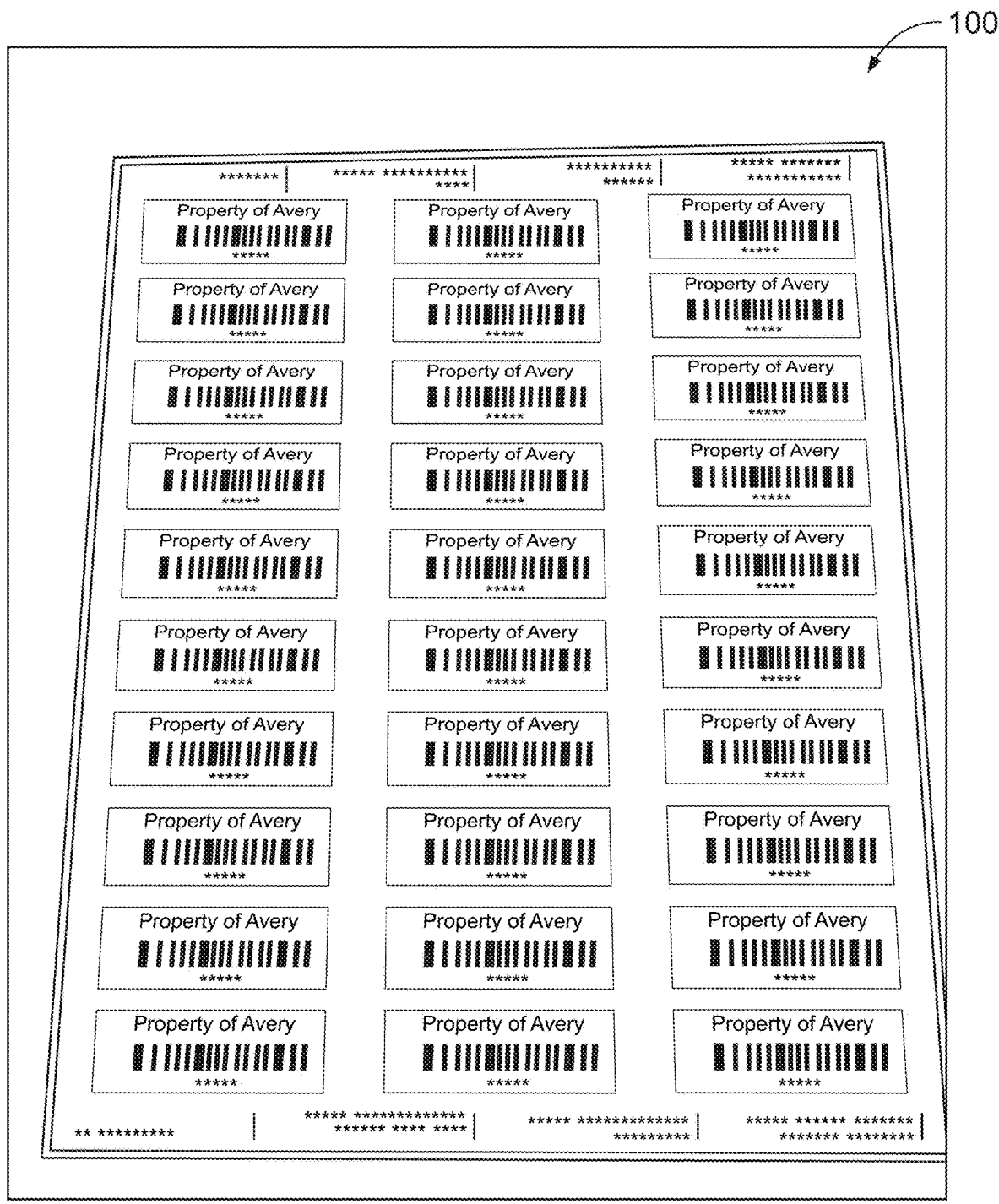
FIG. 8 depicts an embodiment of a label sheet with printed barcodes for asset tracking.

In an embodiment, the printed label sheets 100 may be used for asset tracking and security labeling. For example, the printed label sheets 100 may comprise printed barcodes, see FIG. 8. The metallic color and reflectivity of the label sheets, and the die-cut labels thereon, may enable readability of the barcodes with a handheld scanner up to 24 inches distance. Each label sheet may include a plurality of labels to allow a user to peel or separate each label from the sheet after printing indicia thereon.

The label sheets 100 may be laser printed continuously without changing the dimensional stability of the label sheets 100 and may exit the printer without curling, sticking, jamming, mis-feeding, or otherwise inhibiting the printing process. The printed label sheets 100 may stack on each other flat after printing and may prevent the built up of static electricity and/or dissipate the static electricity quickly so that the printed stacks may be handled by operators substantially shock-free. The printed label sheets 100 may also resistant to bubbling, wrinkling, and chemical exposure and may result in enhanced sustained print quality. The non-leafing silver ink coating layer 140, and its corresponding heat resistance properties, enable the printed label sheets 100 to stack on top of each other flat as they exit the printer and further prevent building up static electricity within the stacked sheets and smudging of the ink.

Figure 9:
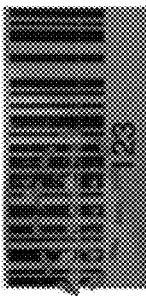
FIG. 9 depicts performance of a label sheet in accordance with aspects disclosed herein, compared to Comparative Examples 1-2.

FIG. 9 depicts experimental data testing various performance qualities of the label sheet 100 as compared with that of Comparative Examples 1 and 2. The label sheet 100 demonstrated (1) greater adhesion bonding to ABS based on a 90° peel and over a period of 24 hours, (2) a greater taber abrasion performance, based on a black laser print, after testing with 500 grams at 20 cycles, (3) a greater chemical resistance after 32 seconds of rubbing for 10 times with IPA, Windex, and 409, (4) a greater print quality for color laser at the laser printing label setting, and (5) a superior printer performance, using printer models OKI C711, HP CLJ300, HP CLJ525, and Brother MF 9330, with no jams and the ability to stack properly in a tray for auto-feed.

Figure 10:
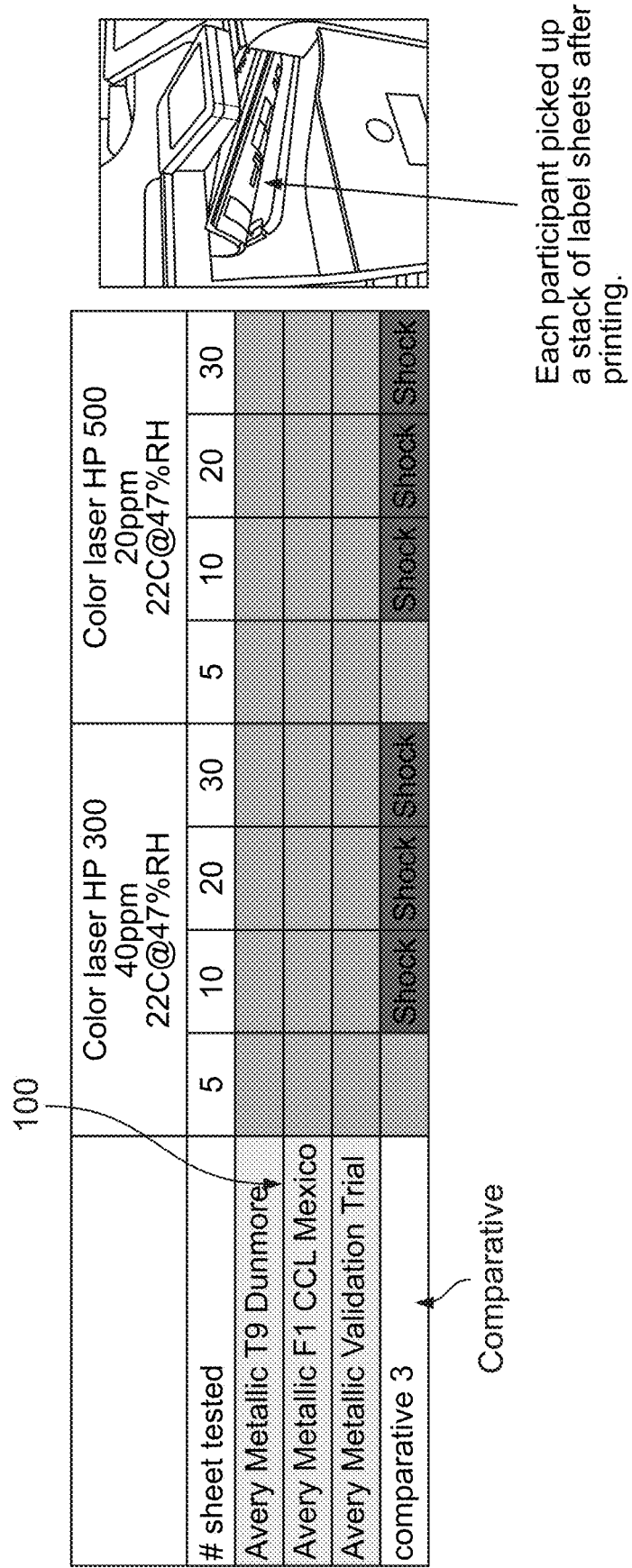
FIG. 10 depicts experimental results of a presence/non-presence of an electrostatic shock of a label sheet in accordance with aspects disclosed herein, compared to Comparative Example 3.

FIG. 10 depicts experimental data testing electrostatic shock properties of the label sheet 100 as compared with single Comparative Example 3. A stack of 5, 10, 20 and 30 sheets of metallic labels were printed with two color laser printers, HP 300 and HP 500, and a group of participants were asked to pick up each stack after it was printed. None of the participants reported to feel any shock when they picked up the stack of printed label sheets 100 even up to 30 sheets. On the other hand, all participants reported that they felt tingling shock of Comparative Example 3 when picked up each a stack of 10, 20 and 30 sheets from the laser printer. Moreover, a spark of static electricity was visually observed after printing 15 sheets for Comparative Example 3.

Figure 11A:
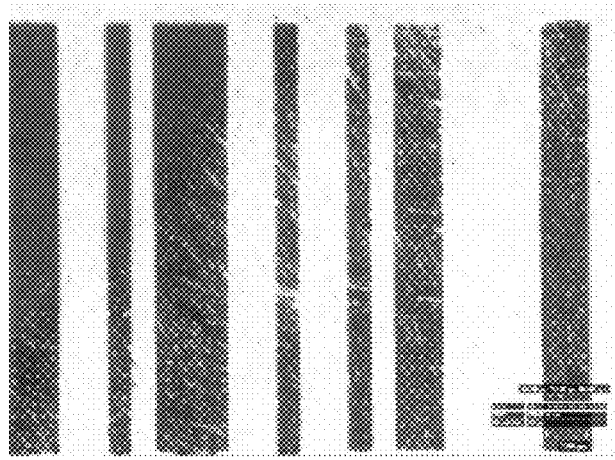
FIGS. 11A-F depict experimental results of an abrasion resistance test for a label sheet in accordance with aspects disclosed herein, compared to Comparative Example 2.
Figure 11B:
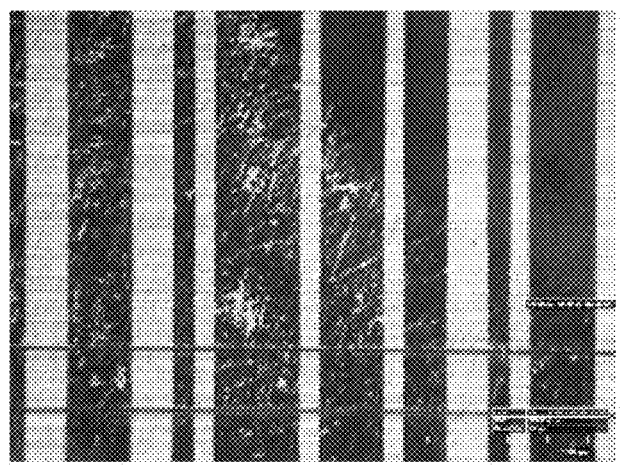
Figure 11C:
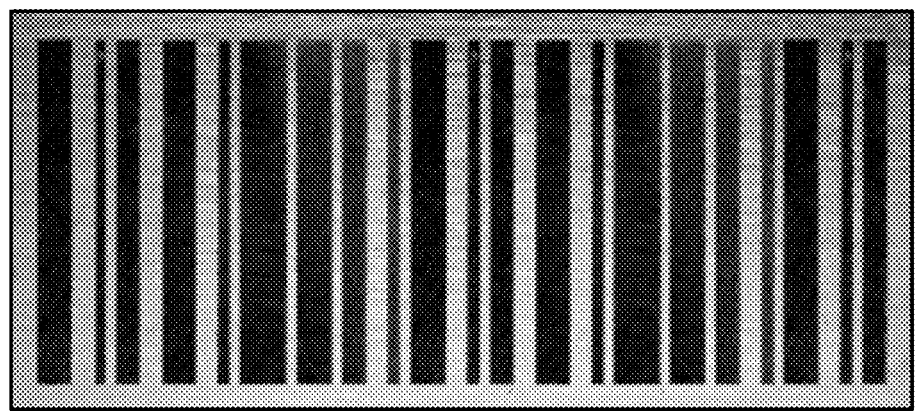

FIGS. 11A-D and Table 4 depict experimental data testing abrasion resistance or toner anchorage of the label sheet 100 as compared with that of Comparative Examples 1-3. The printed label sheet 100 and Comparative Examples 1-3 were each subjected to a Taber abrasion test consisting of 20 cycles or rotations and 500 grams weight on both arms. The printing was then evaluated to determine any change or wear of the printed indicia to determine abrasion resistance. FIG. 11A shows an example of printed indicia that "passed" the abrasion resistance test and FIG. 11B shows an example of printed indicia that "failed" the abrasion resistance test. FIG. 11C shows the results of the printed label sheet 100 after the abrasion resistance test. As shown, the printed indicia on the printed label sheet 100 remained substantially unchanged, showing little to no wear or removal. As a result, the printed label sheet 100 showed high resistance to abrasion and high toner anchorage. These qualities may be useful in labels and may be particularly useful for barcodes where the readability after transport, shipping, shelf life, etc. must be maintained.

Figure 11D:
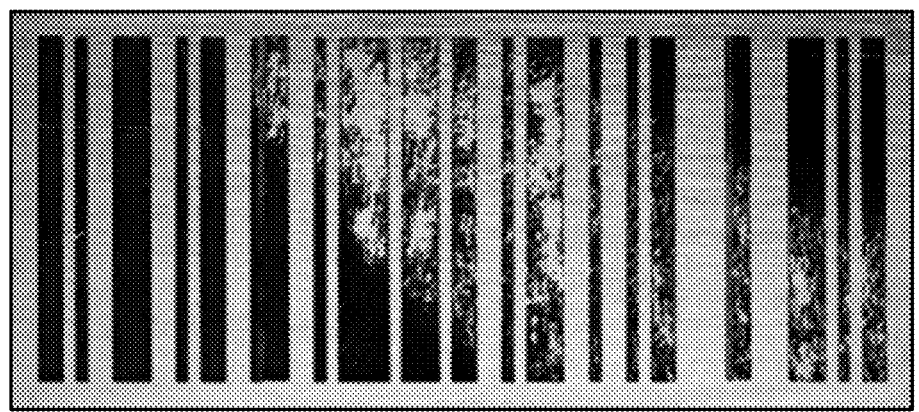
Figure 11E:
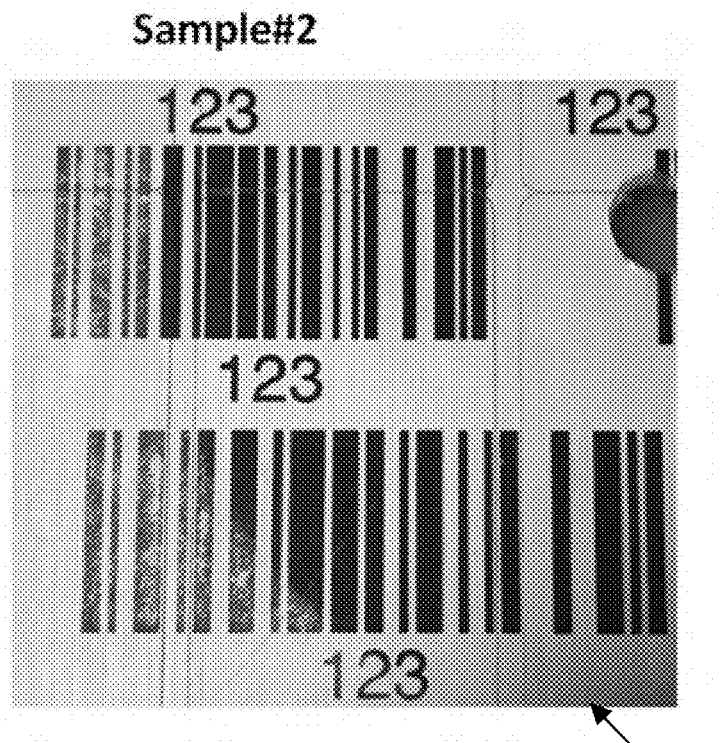
Figure 11F:
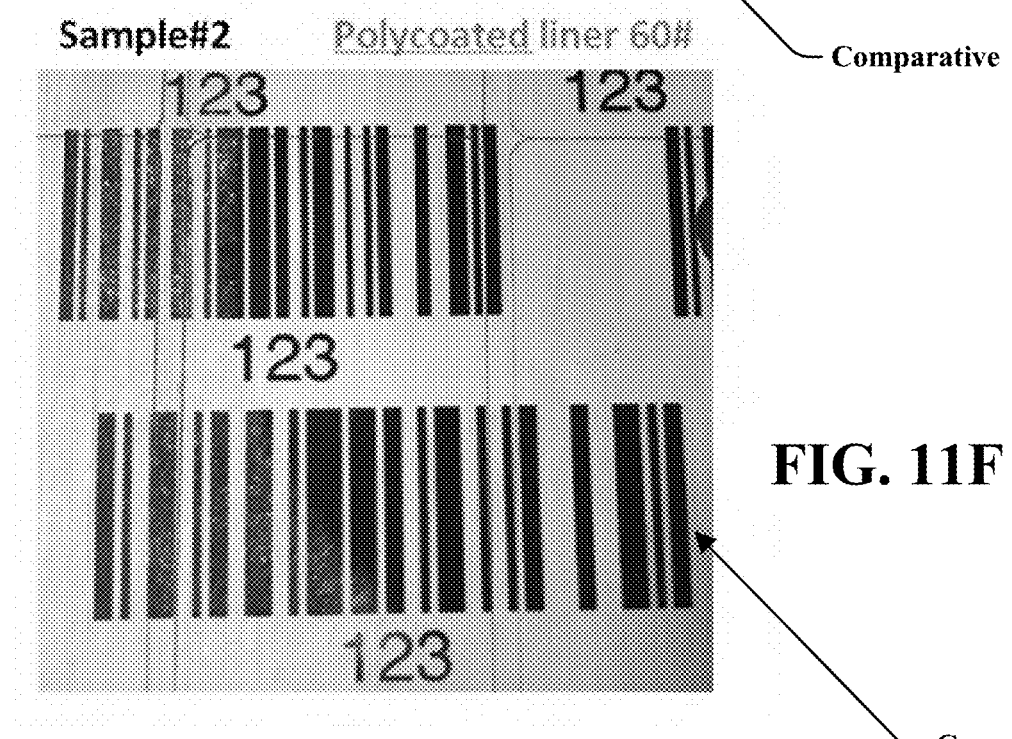

On the other hand, the Comparative Example 2 showed significant wear and removal of the printed indicia following the abrasion resistance test as shown in FIG. 11D. FIGS. 11E-F further show the poor abrasion resistance of Comparative Example 2, with FIG. 11F including a polycoated liner. Table 4 below shows the full test data for the abrasion resistance test for the printed label sheet 100 and Comparative Examples (or Competitors/Samples) 1-3 over 15 samples.

TABLE 4

| Printer: HP Color Laser Jet Pro 300 MFP m375fw Printer Setting: Label | Taber Abrasion (500 grams, 20 cycles) | | | |
|---|---|---|---|---|
| | printed label sheet 100 | Competitor 1 | Competitor 2 | Competitor 3 |
| Sample 1 | Pass | Pass | Fail | Pass |
| Sample 2 | Pass | Pass | Fail | Pass |
| Sample 3 | Pass | Pass | Pass | Pass |
| Sample 4 | Pass | Pass | Pass | Pass |
| Sample 5 | Pass | Pass | Fail | Pass |
| Sample 6 | Pass | Pass | Fail | Pass |
| Sample 7 | Pass | Pass | Pass | Pass |
| Sample 8 | Pass | Pass | Fail | Pass |
| Sample 9 | Pass | Pass | Fail | Pass |
| Sample 10 | Pass | Pass | Pass | Pass |
| Sample 11 | Pass | Pass | Fail | Pass |
| Sample 12 | Pass | Pass | Pass | Pass |
| Sample 13 | Pass | Pass | Fail | Pass |
| Sample 14 | Pass | Pass | Fail | Pass |
| Sample 15 | Pass | Pass | Pass | Pass |

Figure 12A:
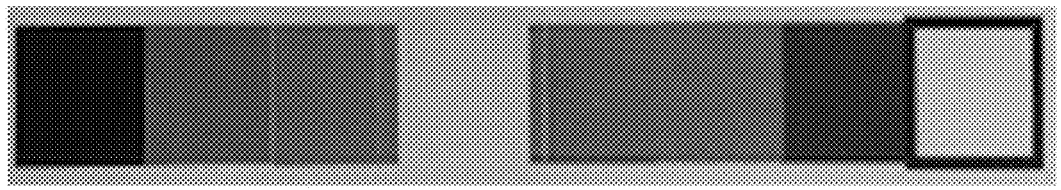
FIGS. 12A-D depict experimental results of a chemical resistance test for a label sheet in accordance with aspects disclosed herein, compared to Comparative Example 1.
Figure 12B:
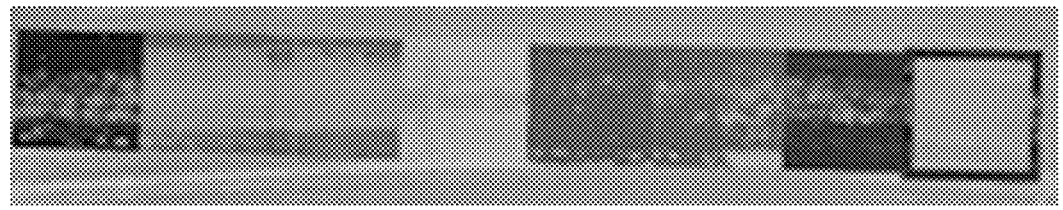
Figure 12C:
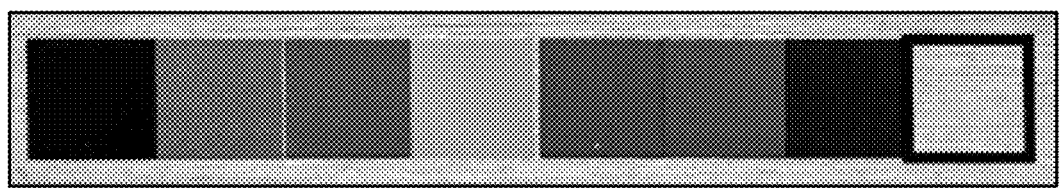
Figure 12D:
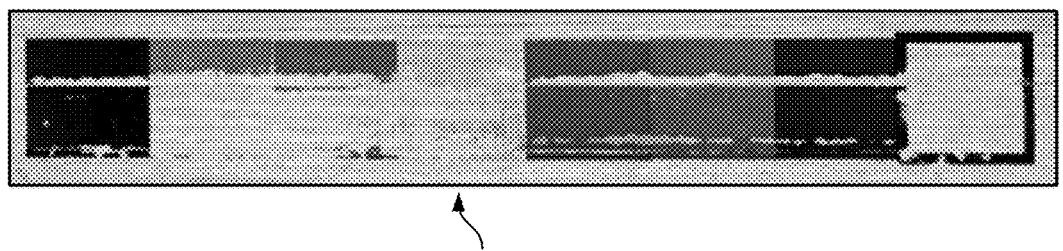

FIGS. 12A-D depict experimental data testing chemical resistance of the label sheet 100 as compared with that of Comparative Examples 1-3. The printed label sheet 100 and the Comparative Examples 1-3 were each subjected to a toughness or chemical resistance test following the UL standard and consisting of a cotton swab soaked in isopropyl alcohol for 32 seconds and rubbed for 10 cycles along the printed indicia. The printing was then evaluated to determine any change or wear of the printed indicia to determine chemical resistance. FIG. 12A shows an example of printed indicia that "passed" the chemical resistance test and FIG. 12B shows an example of printed indicia that "failed" the chemical resistance test. FIG. 12C shows the results of the printed label sheet 100 after the chemical resistance test. As shown, the printed indicia on the printed label sheet 100 remained substantially unchanged, showing little to no wear or removal. As a result, the printed label sheet 100 showed high resistance to chemicals and high toughness. On the other hand, Comparative Example 1 showed significant wear and removal of the printed indicia following the chemical resistance test as shown in FIG. 12D. Table 5 below shows the full test data for the chemical resistance test for the printed label sheet 100 and Comparative Examples (or Competitors/Samples) 1-3 over 15 samples.

TABLE 5

| Printer: HP Color Laser Jet Pro 300 MFP m375fw Printer Setting: Label | Chemical Resistant (IPA soaking for 32 sec, rub 10×) | | | |
|---|---|---|---|---|
| | printed label sheet 100 | Competitor 1 | Competitor 2 | Competitor 3 |
| Sample 1 | Pass | Fail | Pass | Pass |
| Sample 2 | Pass | Fail | Pass | Pass |
| Sample 3 | Pass | Fail | Pass | Pass |
| Sample 4 | Pass | Fail | Pass | Pass |
| Sample 5 | Pass | Fail | Pass | Pass |
| Sample 6 | Pass | Fail | Pass | Pass |
| Sample 7 | Pass | Fail | Pass | Pass |
| Sample 8 | Pass | Fail | Pass | Pass |
| Sample 9 | Pass | Fail | Pass | Pass |
| Sample 10 | Pass | Fail | Pass | Pass |
| Sample 11 | Pass | Fail | Pass | Pass |
| Sample 12 | Pass | Fail | Pass | Pass |
| Sample 13 | Pass | Fail | Pass | Pass |
| Sample 14 | Pass | Fail | Pass | Pass |
| Sample 15 | Pass | Fail | Pass | Pass |

Figure 13A:
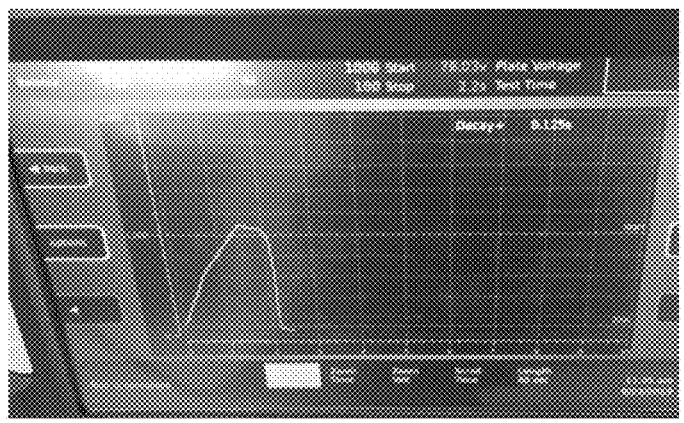
FIGS. 13A-D depict experimental results of an electrostatic decay time or charge dissipation test for a label sheet in accordance with aspects disclosed herein, compared to Comparative Examples 1-3.
Figure 13B:
Figure 13C:
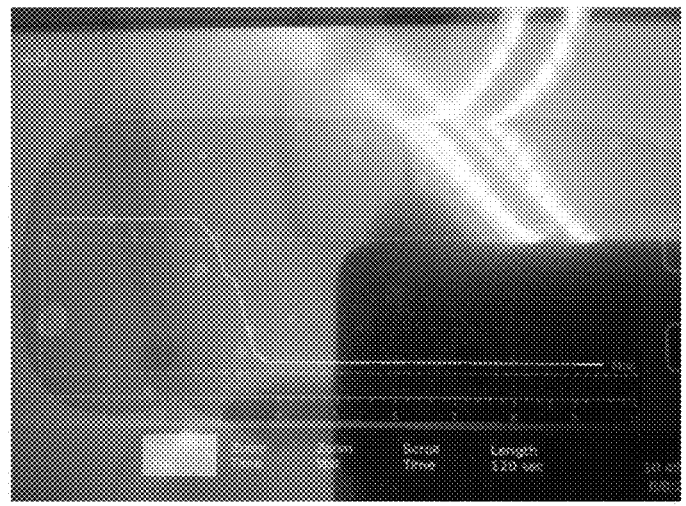
Figure 13D:
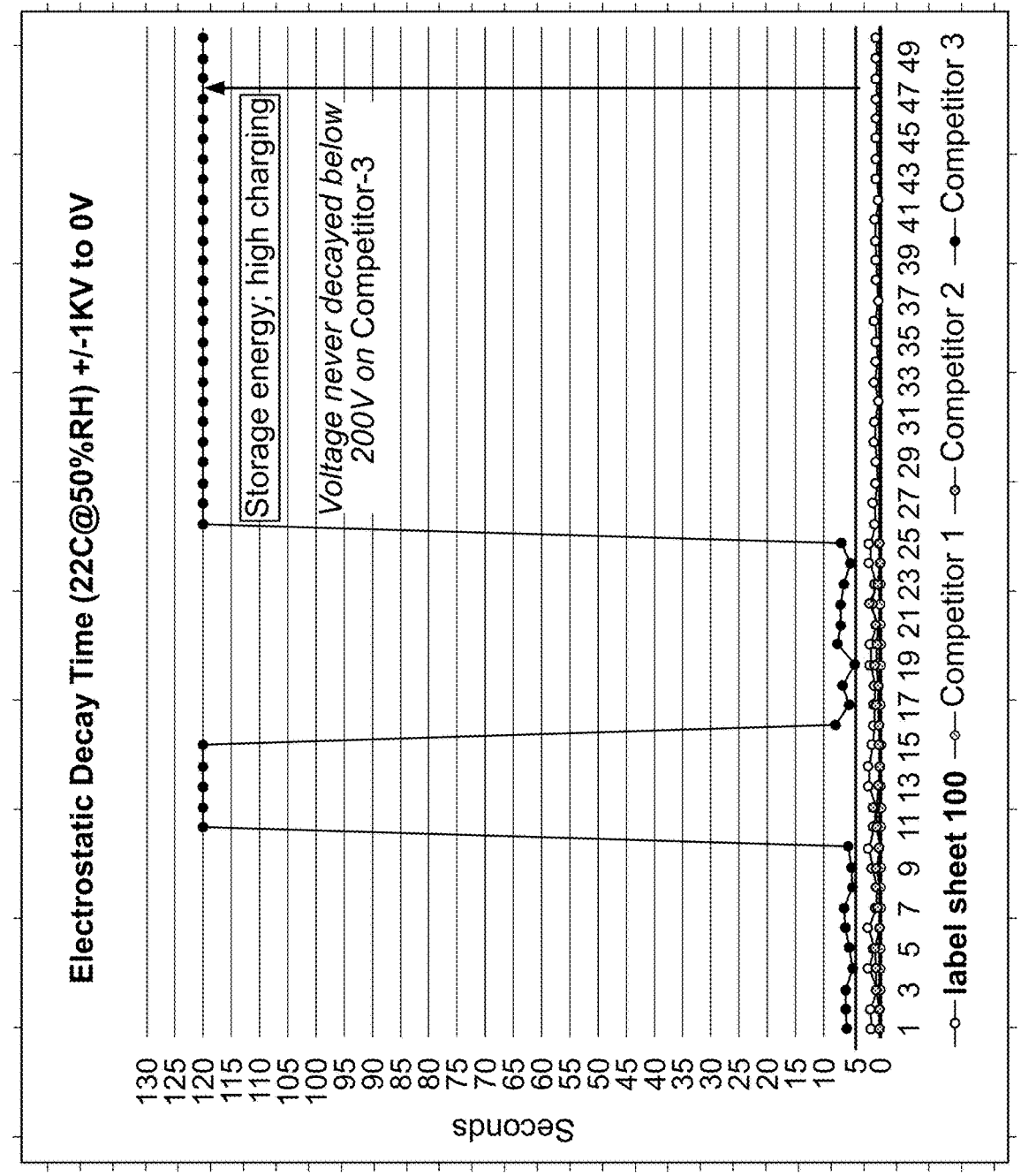

FIGS. 13A-D depict experimental data testing electrostatic decay time or charge dissipation of the label sheet 100 as compared with that of Comparative Examples 1-3. The label sheet 100 and the Comparative Examples 1-3 were each subjected to an electrostatic decay time or charge dissipation test using a charge plate monitor, wherein the copper plate is charged to 1,000 volts or 1 kilovolt, the metallic label sheet is placed face down on the plate, and the time to discharge to 100 volts is measured. Measured time of less than 3 seconds to discharge was considered a "pass" and greater than 4 seconds was considered a "fail." FIGS. 13A-C show the resulting electrostatic decay time graphs with FIG. 13A showing a "pass" and FIGS. 13B-C showing "fails." The graphs include a peak indicating the starting point having a charge of 1,000 volts and a recession through the electrostatic decay and stopping point at 100 volts. FIG. 13A indicates decay to 100 volts in less than 3 seconds. FIG. 13B indicates decay to 100 volts greater than 5 seconds and FIG. 13C shows the voltage never dropping below 200 volts. For Comparative Example 3, the voltage never decayed below 200 volts. Comparative Example 3 also results in a noticeable shock to the user after printing. The label sheet 100 showed good electrostatic decay in less than 3 seconds. FIG. 13D and Table 6 show the full test data for the electrostatic decay time test for the label sheet 100 and Comparative Examples (or Competitors/Samples) 1-3 over 50 samples or trials.

TABLE 6

|  | label sheet 100 | Competitor 1 | Competitor 2 | Competitor 3 |
|---|---|---|---|---|
| 1 | 1.56 | 0.08 | 0.222 | 5.78 |
| 2 | 1.88 | 0.233 | 0.393 | 6.1 |
| 3 | 0.778 | 0.122 | 0.58 | 5.99 |
| 4 | 1.99 | 0.121 | 0.55 | 4.8 |
| 5 | 1.3 | 0.121 | 0.856 | 5.67 |
| 6 | 2.1 | 0.106 | 0.133 | 6.23 |
| 7 | 0.98 | 0.167 | 0.243 | 6.37 |
| 8 | 0.686 | 0.186 | 0.479 | 5.1 |
| 9 | 1.42 | 0.186 | 0.545 | 5.33 |
| 10 | 2 | 0.13 | 0.191 | 5.9 |
| 11 | 1.31 | 0.089 | 0.703 | 120 |
| 12 | 0.92 | 0.108 | 1.1 | 120 |
| 13 | 2.2 | 0.102 | 0.323 | 120 |
| 14 | 2.1 | 0.073 | 0.166 | 120 |
| 15 | 1.38 | 0.106 | 0.318 | 120 |
| 16 | 1.23 | 0.156 | 0.187 | 7.73 |
| 17 | 1.37 | 0.18 | 0.562 | 5.56 |
| 18 | 0.9 | 0.188 | 0.393 | 6.8 |
| 19 | 1.7 | 0.191 | 0.98 | 4.57 |
| 20 | 1.88 | 0.119 | 0.466 | 7.62 |
| 21 | 0.76 | 0.08 | 0.707 | 7.1 |
| 22 | 1.22 | 0.123 | 1.9 | 6.88 |
| 23 | 0.95 | 0.079 | 0.47 | 6.5 |
| 24 | 1.87 | 0.114 | 0.114 | 5.38 |
| 25 | 1.67 | 0.1 | 0.123 | 7 |
| 26 | 1.08 |  |  | 120 |
| 27 | 1.132 |  |  | 120 |
| 28 | 0.784 |  |  | 120 |
| 29 | 0.681 |  |  | 120 |
| 30 | 0.859 |  |  | 120 |
| 31 | 0.981 |  |  | 120 |
| 32 | 0.452 |  |  | 120 |
| 33 | 0.874 |  |  | 120 |
| 34 | 0.737 |  |  | 120 |
| 35 | 0.581 |  |  | 120 |
| 36 | 1.087 |  |  | 120 |
| 37 | 0.488 |  |  | 120 |
| 38 | 0.621 |  |  | 120 |
| 39 | 0.728 |  |  | 120 |
| 40 | 0.798 |  |  | 120 |
| 41 | 1.014 |  |  | 120 |
| 42 | 0.4 |  |  | 120 |
| 43 | 0.625 |  |  | 120 |

TABLE 6-continued

|  | label sheet 100 | Competitor 1 | Competitor 2 | Competitor 3 |
|---|---|---|---|---|
| 44 | 0.56 |  |  | 120 |
| 45 | 0.789 |  |  | 120 |
| 46 | 0.56 |  |  | 120 |
| 47 | 0.67 |  |  | 120 |
| 48 | 0.75 |  |  | 120 |
| 49 | 0.71 |  |  | 120 |
| 50 | 0.658 |  |  | 120 |
| Average | 1.09546 | 0.1304 | 0.50816 | 74.4482 |
| Median | 0.935 | 0.121 | 0.466 | 120 |

Figure 14:
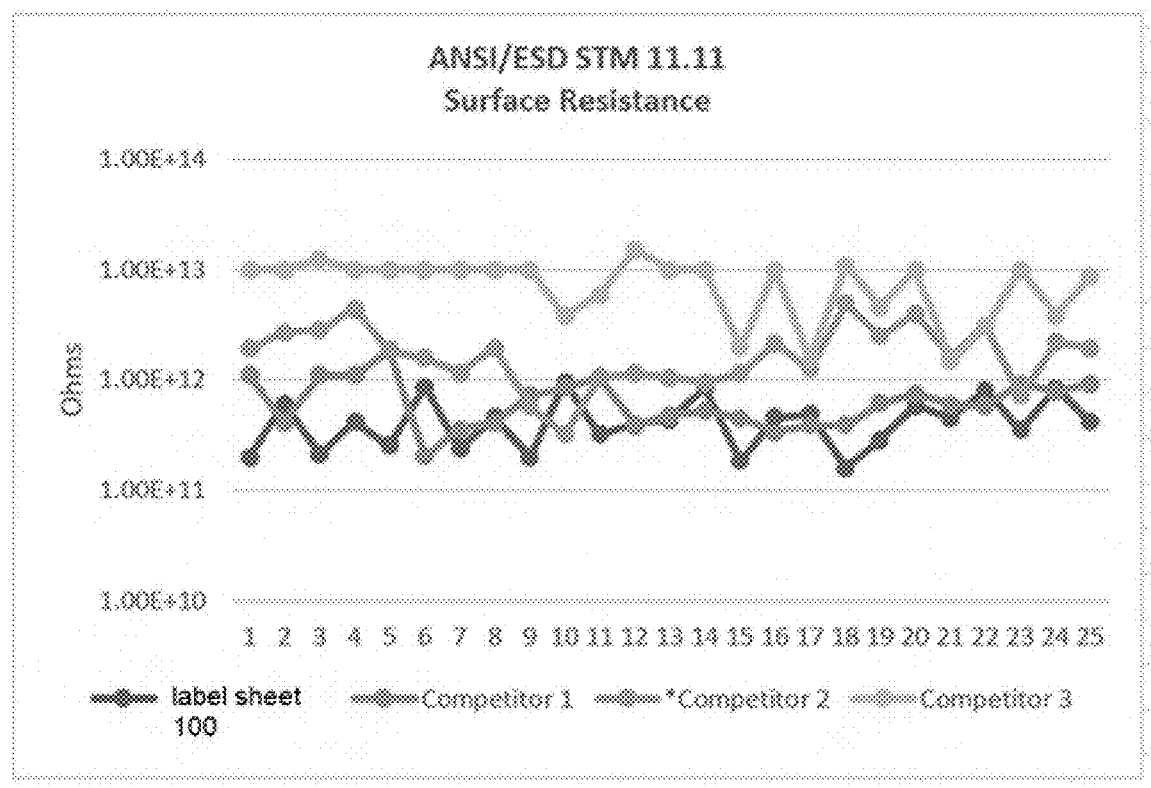
FIG. 14 depicts experimental results of a surface resistance test for a label sheet in accordance with aspects disclosed herein, compared to Comparative Examples 1-3.

FIG. 14 depicts experimental data testing surface resistance of the label sheet 100 as compared with that of Comparative Examples 1-3. The label sheet 100 and the Comparative Examples 1-3 were each subjected to surface resistance test using a Trek Model 152P-CR-1 Concentric Ring Probe and applying a test voltage of 100 volts to the outer ring during surface measurements to determine the surface resistance in the static dissipative range in Ohms. FIG. 14 and Table 7 show the full test data for the surface resistance for the label sheet 100 and Comparative Examples (or Competitors/Samples) 1-3 over 25 samples or trials. The label sheet 100 showed favorable surface resistance while Comparative Example 3 showed poor surface resistance with results over $1 \times 10^{13}$ Ohms, which is the max value of the system.

TABLE 7

|  | label sheet 100 | Competitor 1 | *Competitor 2 | Competitor 3 |
|---|---|---|---|---|
| 1 | 1.99E+11 | 1.11E+12 | 1.92E+12 | 1.00E+13 |
| 2 | 6.05E+11 | 4.11E+11 | 2.71E+12 | 1.00E+13 |
| 3 | 2.15E+11 | 1.11E+12 | 2.85E+12 | 1.24E+13 |
| 4 | 4.15E+11 | 1.11E+12 | 4.45E+12 | 1.00E+13 |
| 5 | 2.55E+11 | 1.86E+12 | 1.88E+12 | 1.00E+13 |
| 6 | 8.64E+11 | 2.03E+11 | 1.5E+12 | 1.00E+13 |
| 7 | 2.4E+11 | 3.52E+11 | 1.17E+12 | 1.00E+13 |
| 8 | 4.61E+11 | 4.09E+11 | 1.96E+12 | 1.00E+13 |
| 9 | 1.99E+11 | 7.28E+11 | 5.77E+11 | 1.00E+13 |
| 10 | 9.54E+11 | 8.57E+11 | 3.22E+11 | 3.86E+12 |
| 11 | 3.21E+11 | 1.05E+12 | 1.07E+12 | 5.94E+12 |
| 12 | 3.97E+11 | 3.83E+11 | 1.15E+12 | 1.53E+13 |
| 13 | 4.36E+11 | 4.8E+11 | 1.06E+12 | 1.00E+13 |
| 14 | 8.48E+11 | 5.2E+11 | 9.5E+11 | 1E+13 |
| 15 | 1.85E+11 | 4.49E+11 | 1.15E+12 | 1.98E+12 |
| 16 | 4.62E+11 | 3.37E+11 | 2.15E+12 | 1E+13 |
| 17 | 4.91E+11 | 3.93E+11 | 1.27E+12 | 1.54E+12 |
| 18 | 1.58E+11 | 3.93E+11 | 4.98E+12 | 1.11E+13 |
| 19 | 2.86E+11 | 6.16E+11 | 2.50E+12 | 4.55E+12 |
| 20 | 5.86E+11 | 7.45E+11 | 4.04E+12 | 1.00E+13 |
| 21 | 4.5E+11 | 6.1E+11 | 1.62E+12 | 1.52E+12 |
| 22 | 8.1E+11 | 5.77E+11 | 3.12E+12 | 3.04E+12 |
| 23 | 3.52E+11 | 9.28E+11 | 7.21E+11 | 1E+13 |
| 24 | 8.36E+11 | 7.85E+11 | 2.21E+12 | 3.89E+12 |
| 25 | 4.19E+11 | 9.29E+11 | 1.95E+12 | 8.83E+12 |
| Average | 4.58E+11 | 6.9418E+11 | 1.9752E+12 | 8.158E+12 |
| Median | 4.19E+11 | 6.1E+11 | 1.88E+12 | 1E+13 |

These various experimental results regarding abrasion resistance, chemical resistance (IPA), charge dissipation, and surface resistance demonstrate that the label sheet 100 is able to exhibit all of these desirable properties and provide high quality printer performance. Moreover, the Comparative Examples 1-3 (also referred to herein and in the Figures as Samples 1-3 or Competitors 1-3) fall short on one or more of these categories and often at levels far outside of acceptability and usability, in addition to encountering print quality problems addressed herein including curling, sticking, jamming, mis-feeding, bubbling, wrinkling, chemical exposure, and other print quality problems.

Table 8 below compares some of the physical properties of the label sheet 100 with that of the Comparative Examples 1-3, including the thickness, continuity, % weight of aluminum, oxygen, and carbon of the metallic layers; the surface resistance; the electrostatic decay time; the caliper of the total construction, the liner, and the face plus adhesive; the printer performance, and the toner anchorage or abrasion resistance of the sheets. As is shown below and herein, the label sheet 100 provides desirable properties including lower surface resistance, quicker decay time, high printer performance quality, and good toner anchorage or abrasion resistance. Comparative Examples 1-3 fail to provide similar properties and are inadequate. Also, none of the Comparative Examples 1-3 include at least a UV or UV/LED ink coating, such as metallic, grey, nor a UV primer coating. In an embodiment, at 1 microns thickness the label sheet 100 may have an aluminum wt % ranging from 2.5% to 10.5% distributed non-uniformly within the coating. The label sheet 100 may still exhibit dissipation of static electricity. On the other hand, as shown herein, for Comparative Examples 1-3, the Aluminum wt % at 1 microns thickness may need to be kept at low level (between 3-4%) uniformly in order to show any electric charge dissipation.

pigments 142 that may be smoother, have a rounded edge, and result in a more homogenous thickness with minimal to no surface defects, see also FIG. 6A. These silver dollar pigments or the method of providing the metallic interlayer, such as by printing, may also result in a non-continuous layer and channels 144 that, as described herein and as shown in FIG. 5B, may prevent the build-up of static electricity and/or dissipate the static electricity quickly. Such shape and/or orientation of the ink pigments 142 of the metallic interlayer 140 may demonstrate a reduced reflectivity due to scattering of visible light, and an overall high vibrancy of the metal color, and may result in a more shock-free performance. On the other hand, the metal layers of the Comparative Examples 1-3 are continuous as shown in the electron images of FIGS. 15A-C and demonstrate high reflectivity and poor shock resistance as shown in FIG. 5A.

Figure 16A:
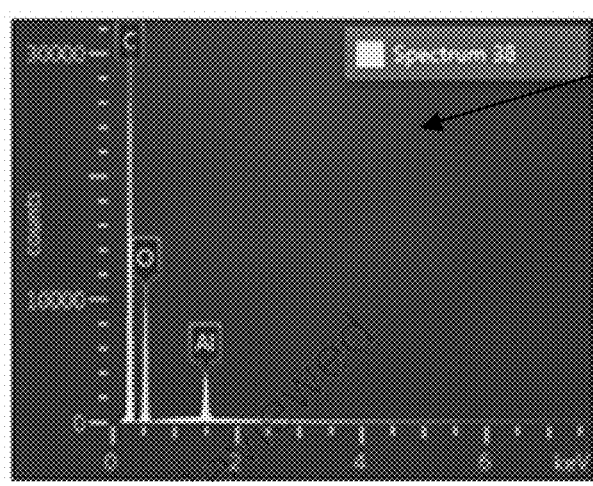
FIG. 16A-C show the metal composition of metal layers of Comparative Examples 1-3.
Figure 16B:
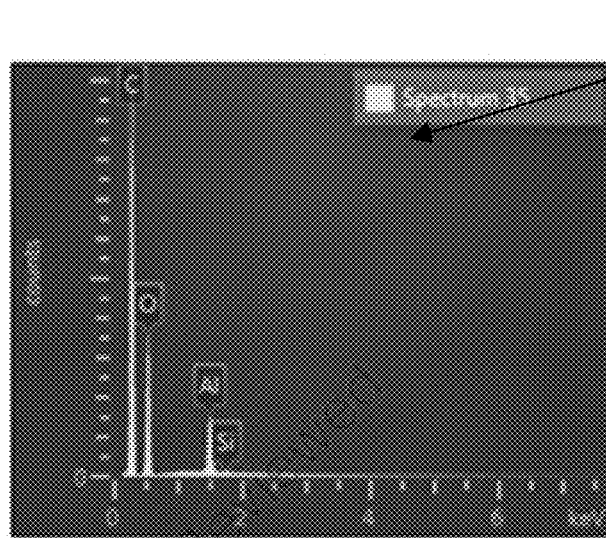
Figure 16C:
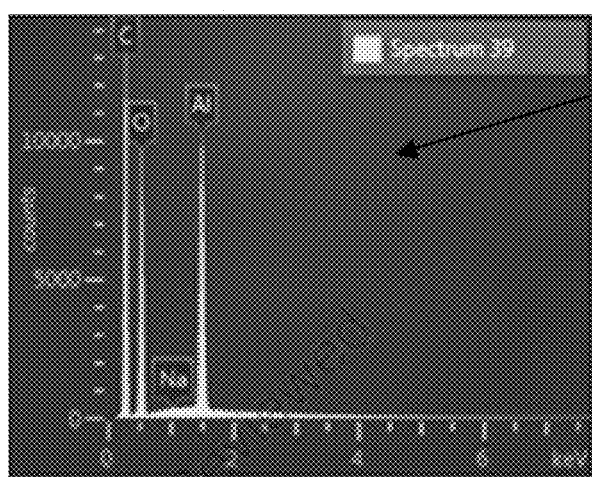

FIGS. 16A-C and Tables 9-11 further show the composition of each Comparative Examples 1-3, which may be compared to FIG. 6C and Table 2 showing the composition of an embodiment of the metallic interlayer 140 of the label sheet 100. Higher levels of aluminum (as in comparative

TABLE 8

| Performance | label sheet 100 | Sample #1 | Sample #2 | Sample #3 | Comments |
|---|---|---|---|---|---|
| Metallic layer thickness (um) | <1 um | <1 um | 2-4 um | <1 um | |
| Metallic layer | Non-continues | Continues raster line | Continues raster line | Continues | |
| % Weight of Aluminum in metallic layer | 5.2% | 4.24% | 3.74% | 12.43% | Higher AL metal - store charges |
| % Weight of O in metallic layer | 22.76% to 26.75% | 34.18% | 34.80% | 35.45% | Higher O (Oxygen) → higher oxidation resistance |
| % Weight of C in metallic layer | 66%-72% | 61.48% | 61.46% | 52.02% | Higher C → Higher organic insulant (good insulator) Higher C → dissipate quicker not transfer charges. |
| Surface resistance (ohms) | 4.19E+11 | 6.94E+11 | 1.97E+12 | 1.00E+13 | Lower resistence → good |
| Electrostatic Decay time (sec) | 0.935 | 0.121 | 0.466 | 120 | Lower decay time → good |
| Caliper (mil)-Total construction (mil) | 7.66 ± 0.10 | 4.93 ± 0.18 | 11.38 ± 0.34 | 8.762 ± 0.055 | |
| Caliper (mil)-Liner | 4.284 ± 0.037 | 2.67 ± 0.16 | 6.68 ± 0.12 | 5.344 ± 0.064 | |
| Caliper (mil)-Face + Abhesive | 3.37 ± 0.10 | 2.26 ± 0.17 | 4.71 ± 0.37 | 3.418 ± 0.067 | |
| Printer performance | No issue | Sheets wrinkles & jams inside printers | Exit tray jams | No issues | Sample#1 OL: Film face construction is too thin ~1.6 mil and heat sensitive Sample#2 MAT-liner loss moisture after printing cause label sheet curls up and jam at exit tray |
| Toner Anchorage/Abrasion resistance | Good | Good | Poor | Good | 1. Sample#3MAT: label construction is thick 11.4 mil, not enough heat and pressure during fusing process. 2. Poor wetting printed side based on Contact Angle. |

* Note:
label sheet 198 metallic layer (2.5%, 5.2%. 10.58%)

FIGS. 15A-C shows electron images of the metal layers in each Comparative Examples 1-3, which may be compared to the electron image of an embodiment of the metallic interlayer 140 of the label sheet 100 shown in FIG. 6B. As can be seen in FIG. 6B, the metallic interlayer 140 and non-leafing silver ink coating technology results in ink Example 3 for example) may result in greater electrostatic decay time, higher oxygen content (as in all the Comparative Example 1-3) may result in higher oxidation resistance, and the lower carbon content (as in all the Comparative Example 1-3) may result in poor insulation and holding of an electrostatic charge.

TABLE 9

Sample #1

| Element | Line Type | Wt % | Wt % Sigma | Atomic % |
|---|---|---|---|---|
| C | K series | 61.46 | 0.30 | 69.01 |
| O | K series | 34.18 | 0.30 | 28.81 |
| Al | K series | 4.24 | 0.08 | 2.12 |
| Si | K series | 0.12 | 0.03 | 0.06 |
| Total | | 100.00 | | 100.00 |

TABLE 10

Sample #2

| Element | Line Type | Wt % | Wt % Sigma | Atomic % |
|---|---|---|---|---|
| C | K series | 61.46 | 0.17 | 68.86 |
| O | K series | 34.80 | 0.17 | 29.27 |
| Al | K series | 3.74 | 0.04 | 1.86 |
| Total | | 100.00 | | 100.00 |

TABLE 11

Sample #3

| Element | Line Type | Wt % | Wt % Sigma | Atomic % |
|---|---|---|---|---|
| C | K series | 52.02 | 0.21 | 61.77 |
| O | K series | 35.45 | 0.20 | 31.60 |
| Na | K series | 0.01 | 0.03 | 0.06 |
| Al | K series | 12.43 | 0.08 | 6.57 |
| Total | | 100.00 | | 100.00 |

Figure 17A:
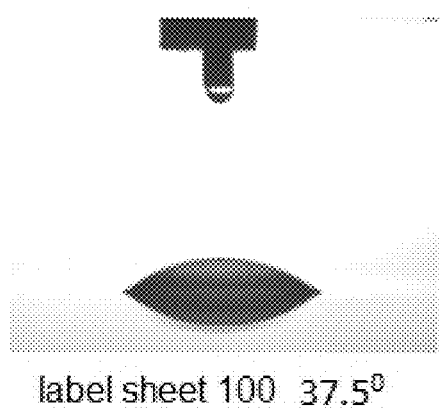
FIGS. 17A-B depict experimental results determining wetting and surface energy for a label sheet in accordance with aspects disclosed herein, compared to Comparative Example 2.
Figure 17B:
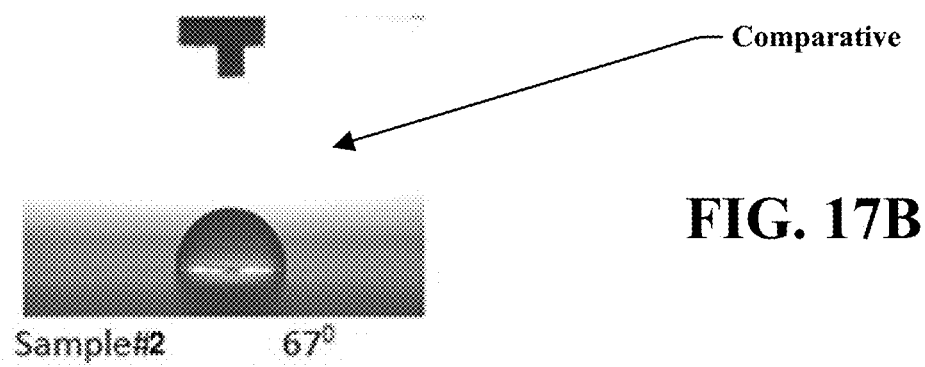

FIG. 17A-B depicts experimental data testing wetting and surface resistance of the label sheet 100 as compared with that of Comparative Example 2. As seen in FIG. 17A, label sheet 100 shows better wetting and high surface energy compared with Comparative Example 2 shown in FIG. 17B exhibiting poor wetting and low surface energy based on the angle of the droplet. In FIG. 17A, the droplet is dispersed showing an angle of about 37.5° whereas the droplet in FIG. 17B shows higher tension and an angle of about 67°. This may be a factor in the poor abrasion resistance of Comparative Example 2.

Table 12 shows the characterization and the thickness of the layers in the label sheet 100 and in the Comparative Examples 1-3.

TABLE 12

| Samples tested | Construction layer | Layer Description | Thickness (um) | Characterization | Metal Contain (AL) Wt % | Metal Layer Appearance |
|---|---|---|---|---|---|---|
| label sheet 100 | 1 | Liner | 108.8 um | IR: Cellulose with Kaolin aluminosilicate clay | | |
| | 2 | Adhesive | | IR: Poly (butyl acrylate) or other acrylate adhesive | | |
| | 3 | Metallic coating | <1 um | EDS: Aluminum or Alumina islands | 5.2% | Non-continues |
| | 4, 5 | Printable top coat + film | 50-60 um | IR: Polyester (PET) | | |
| Sample #1 | 1 | Liner coating | 20 um | IR: Polyethylene | | |
| | | Paper liner | ~42 um | IR: Cellulose | | |
| | 2 | Adhesive | | IR: Poly (butyl acrylate) or other acrylate adhesive | | |
| | 3 | Metallic layer | <1 um | EDS: Aluminum or Alumina with raster line | 4.24% | Raster line continues |
| | 4, 5 | Printable top coat + film | ~36 um | IR: Polyester (PET) | | |
| Sample #2 | 1 | Liner | ~169 um | IR: Cellulose with calcium carbonate | | |
| | 2 | Adhesive | | IR: Poly (butyl acrylate) or other acrylate adhesive | | |
| | 3 | Metallic layer | 2-4 um | EDS: Aluminum or Alumina with raster line | 3.74% | Raster line continues |
| | 4 | Film | ~30-35 um | IR: Polyester (PET) | | |
| | 5 | Adhesive | | EDS: Aluminum or Alumina with raster line | | |
| | 6 | Film overlaminated | ~23 um | IR: Polyester (PET) | | |
| | 7 | Printable top coat | ~10 um | IR: Polyester (PET) with Kaolin-aluminosilicate clay | | |

TABLE 12-continued

| Samples tested | Construction layer | Layer Description | Thickness (um) | Characterization | Metal Contain (AL) Wt % | Metal Layer Appearance |
|---|---|---|---|---|---|---|
| Sample #3 | 1 | Liner back | ~109 um | IR: Polyester (PET) with Kaolin-aluminosilicate clay | | |
| | | Liner paper | | IR: Cellulose with calcium carbonate | | |
| | | Liner silicone | ~25 um | IR: Polyethylene | | |
| | 2 | Adhesive layer | | IR: Poly (butyl acrylate) or other acrylate adhesive | | |
| | 3 | Metallic layer | <1 um | EDS: Aluminum or Alumina | 12.43% | Continues |
| | 4 | Film | ~30 um | IR: Polyester (PET) | | |
| | 5 | Printable topcoat | ~34 um | IR: Polyester with Kaolin aluminosilicate clay | | |

*Note:
label sheet 100 metallic layer (2.5%, 5.2%, 10.58%)

Figure 2:
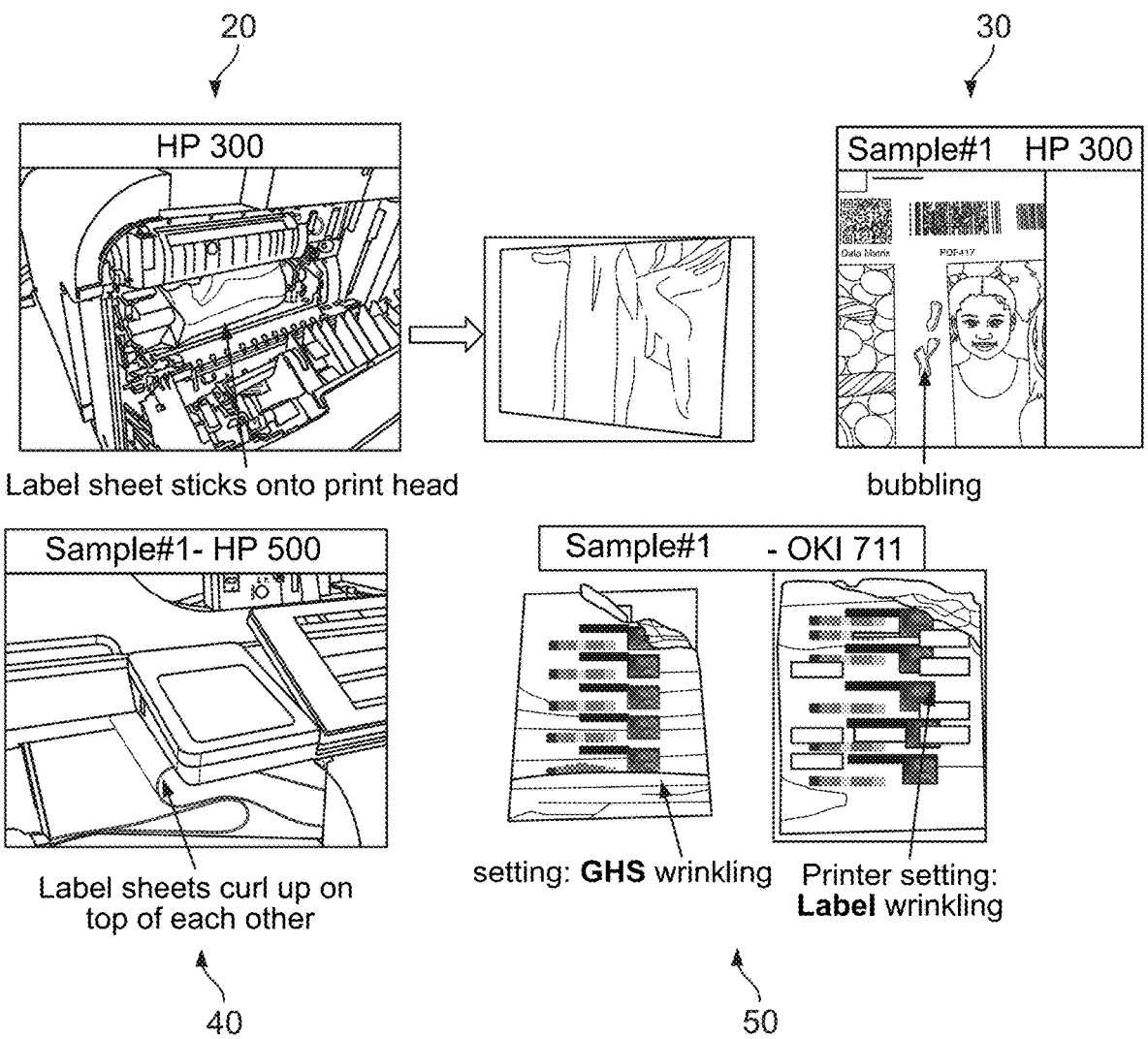

Table 12 shows that Comparative Example 1 has a thin label construction (TC 4.93 mil, face 2.26 mil, liner 2.67 mil), the face is thin and heat sensitive, and the liner is too soft or flexible as there is no filler at the top layer (e.g., Kaolin clay or Calcium carbonate based on IR analysis). Each of these qualities may cause Comparative Example 1 to exhibit the poor printer performance, including sticking and wrinkling, as observed in the printing trials of Comparative Example 1 and shown in FIG. 2. In an embodiment, the label sheet 100 comprises a stable liner construction such as clay-coated kraft layflat liner. This stable liner construction may be less susceptible to dimensional changes resulting from moisture effects and may move through laser printers more reliably without jamming, wrinkling, or curling. Other stable liner constructions may include a polycoated paper liner or film liner.

As shown in FIGS. 11E-F, poor abrasion resistance was still observed for Comparative Example 2 even at greater thicknesses. In FIG. 11E, the total construction was 11.38 mil with the liner being 6.68 mil and in FIG. 11F, the total construction was 9.17 mil with the polycoated liner being 4.49 mil. Poor abrasion resistance was observed on both liners in Comparative Example 2.

Figure 18A:
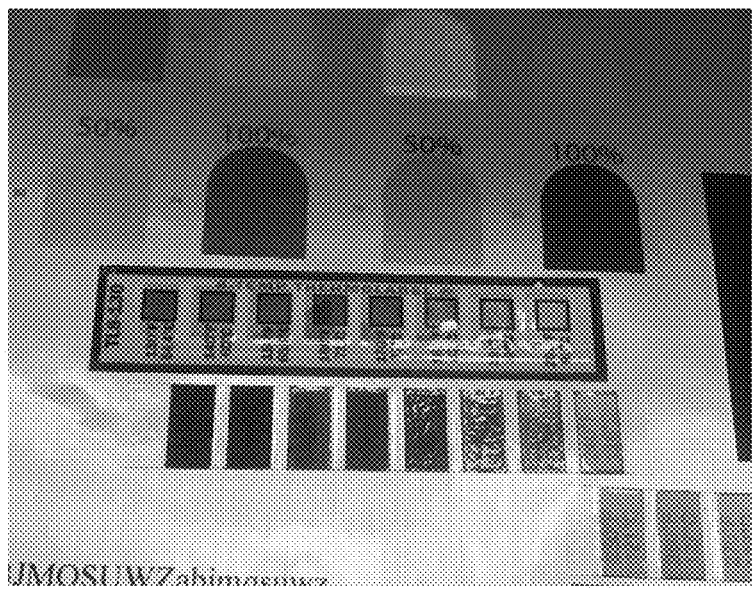
FIGS. 18A-B show the heat sensitivity of Comparative Example 1.
Figure 18B:
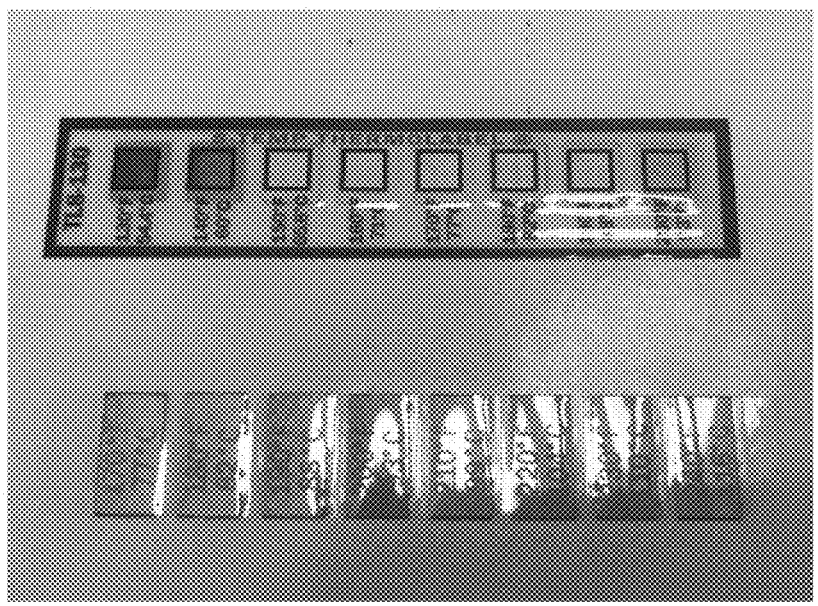

Table 13 shows experimental data testing the heat sensitivity of the label sheet 100 as compared with that of Comparative Examples 1-3. FIGS. 18A-B further show the results of the heat sensitivity testing in regard to Comparative Example 1.

TABLE 13

| | HP 300 Original | | HP 300 Polycoated Liner | | |
|---|---|---|---|---|---|
| | Face | Liner | Face | Liner Polycoated 60# | |
| label sheet 100 | 230F | 130F | Same as original | | |
| Sample #1 | 230F | 140F 2.7 mil | 230F | 140F 4.5 mil | Face is conducted heat so well. Even with thicker liner (Polycoated 60#); temperature is the same as liner 2.7 mils vs. 4.5 mil |
| Sample #2 | 220F | 113F 6.7 mil | 220F | 130F thinner 4.5 mil | Polycoated thinner -> higher temp |
| Sample #3 | 220F | 122F 3.4 mil | 22F | 130F thinner 4.5 mil | Polycoated thinner -> higher temp |

Figure 19:
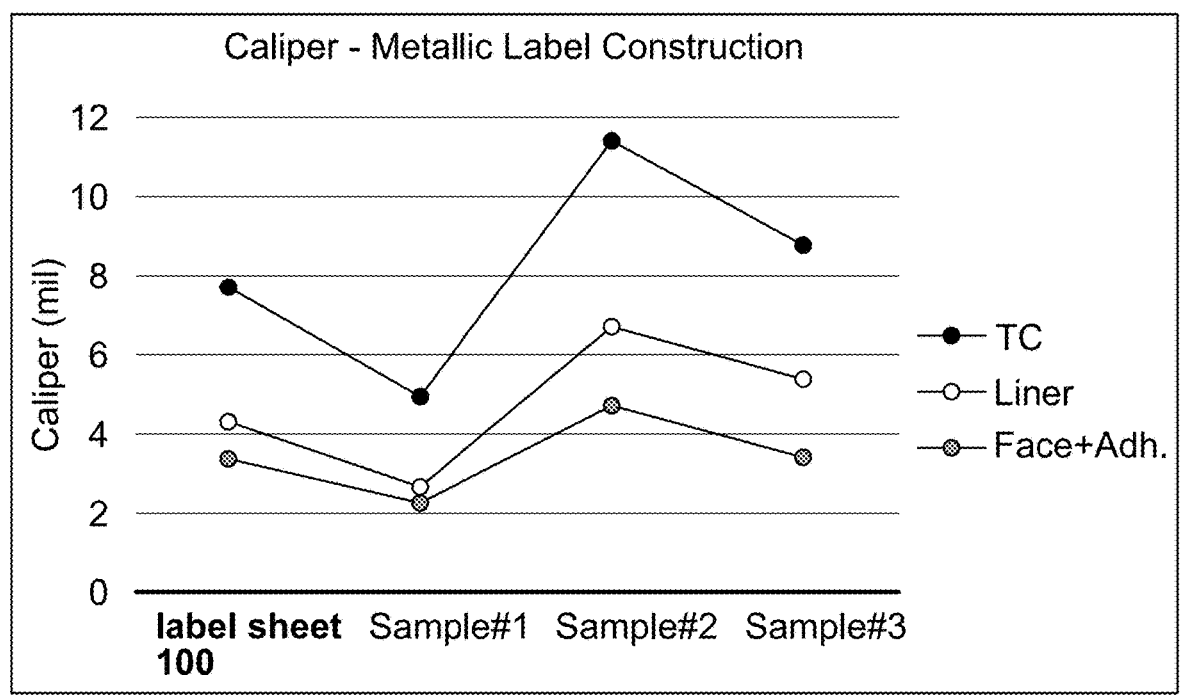
FIG. 19 depicts experimental results determining caliper for a label sheet in accordance with aspects disclosed herein, compared to Comparative Examples 1-3.

FIG. 19 depicts experimental results determining caliper for an embodiment of the label sheet 100, compared to Comparative Examples 1-3. Table 14 below further quantifies these results showing caliper and stiffness for the label sheet 100 and Comparative Examples 1-3.

TABLE 14

| Samples tested | label sheet 100 | Sample#1 | Sample#2 | Sample#3 |
|---|---|---|---|---|
| Caliper (mils) | | | | |
| Total Construction | 7.66 ± 0.10 | 4.93 ± 0.18 | 11.38 ± 0.34 | 8.762 ± 0.055 |
| Liner | 4.284 ± 0.037 | 2.67 ± 0.16 | 6.68 ± 0.12 | 5.344 ± 0.064 |
| Face + Adhesive | 3.37 ± 0.10 | 2.26 ± 0.17 | 4.71 ± 0.37 | 3.418 ± 0.067 |
| Caliper (um) | | | | |
| Total Construction | 194.5 ± 2.5 | 125.2 ± 4.6 | 289.1 ± 8.6 | 222.6 ± 1.4 |
| Liner | 108.8 ± 0.9 | 67.9 ± 4.0 | 169.6 ± 3.0 | 135.7 ± 1.6 |
| Face + Adhesive | 85.6 ± 2.5 | 57.3 ± 4.3 | 120 ± 9 | 86.8 ± 1.7 |
| Contact Angle (°) | 37.3 ± 1.4 | 37.5 ± 1.5 | 66.8 ± 1.7 | 96.1 ± 4.0 |

TABLE 14-continued

| Samples tested | label sheet 100 | Sample#1 | Sample#2 | Sample#3 |
|---|---|---|---|---|
| Stiffness (mN) Total Construction | | | | |
| MD | 162.1 ± 11.6 | 83.5 ± 7.5 | 255.0 ± 9.3 | 208 ± 24 |
| CD | 122.3 ± 8.8 | 70.4 ± 2.7 | 175 ± 23 | 165 ± 26 |
| Average MD & CD | 142.2 ± 7.5 | 77.0 ± 2.7 | 214.8 ± 7.1 | 187 ± 25 |
| Stiffness (mN) Face + Adh. | | | | |
| MD | 7.4 ± 1.1 | 2.6 ± 1.6 | 10.7 ± 3.4 | 9.7 ± 1.2 |
| CD | 9.0 ± 3.9 | 2.8 ± 1.2 | 12.6 ± 3.2 | 11.8 ± 3.2 |
| Average MD & CD | 8.6 ± 2.7 | 2.7 ± 1.3 | 12.2 ± 3.3 | 11.5 ± 2.8 |
| Stiffness (mN) Liner | | | | |
| MD | 89.8 ± 12.0 | 42.8 ± 7.3 | 164.8 ± 10.8 | 90 ± 12 |
| CD | 58.7 ± 5.1 | 23.4 ± 7.5 | 98 ± 17 | 50.8 ± 11.2 |
| Average MD & CD | 74.2 ± 4.9 | 33.1 ± 1.2 | 131 ± 14 | 69.0 ± 3.2 |

Stiffness sample size: 24/32" x 24/32" (TMI Bending Resistance V2.7-1N 15° @ 10 mm)

In an embodiment, the stiffness range of the label sheet 100 may be 100 mN-230 mN. In an embodiment, the surface energy range (as measured by the contact angle) of the label sheet may be less than 50°. In an embodiment, having a label sheet that is too flexible or too rigid may negatively impact printer performance, as shown in the experimental results for Comparative Example 1. Additionally, having a higher surface energy may help the toner adhere more strongly to the printable surface.

Although the embodiments of the present teachings have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A method of making a printable label sheet comprising:
   forming a film layer having a first surface and a second surface;
   depositing a primer layer on the second surface of the film layer;
   depositing a metallic interlayer on the primer layer;
   depositing a colored coating layer on the metallic interlayer;
   depositing an adhesive on the colored coating layer;
   depositing a liner layer on the adhesive;
   wherein the metallic interlayer comprises 2.5 wt. % to 10 wt. % of non-leafing ink pigments that are dispersed throughout the entire metallic interlayer, wherein the metallic interlayer comprises a discontinuous formation of metal clusters, and the metallic layer has a thickness of less than 1 micron.

2. The method of claim 1, wherein individual labels are die cut into the label sheet through all the layers except the liner layer.

3. The method of claim 1, wherein one or more of the layers are UV-cured.

4. The method of claim 1, wherein depositing the metallic interlayer comprises printing the metallic interlayer.

5. The method of claim 1, wherein the non-leafing metallic pigments are silver.

6. The method of claim 1, wherein the metallic interlayer comprises aluminum.

7. The method of claim 6, wherein the metallic interlayer comprises less than 12% aluminum.

8. The method of claim 1, wherein the non-leafing metallic pigments form channels within the metallic interlayer.

9. The method of claim 1, wherein the non-leafing pigments are dispersed throughout the entire metallic interlayer.

10. The method of claim 1, wherein the non-leafing metallic pigments have a smooth surface, a rounded shape, and are homogenous in thickness.

11. The method of claim 1, wherein a color of the metallic interlayer corresponds to a color of the colored coating layer.

12. The method of claim 1 comprising coating the first surface of the film layer with a printable coating layer.

13. The method of claim 1, wherein the total thickness of the printable label sheet is between 6 to 10 mil.

* * * * *